(12) United States Patent
Sakagawa et al.

(10) Patent No.: US 11,524,737 B2
(45) Date of Patent: Dec. 13, 2022

(54) ACTUATION DEVICE AND TELESCOPIC APPARATUS

(71) Applicant: SHIMANO INC., Sakai (JP)

(72) Inventors: Yuki Sakagawa, Sakai (JP); Toyoto Shirai, Sakai (JP); Yoshimitsu Miki, Sakai (JP)

(73) Assignee: SHIMANO INC., Sakai (JP)

( * ) Notice: Subject to any disclaimer, the term of this patent is extended or adjusted under 35 U.S.C. 154(b) by 601 days.

(21) Appl. No.: 16/414,858

(22) Filed: May 17, 2019

(65) Prior Publication Data

US 2020/0079453 A1 Mar. 12, 2020

Related U.S. Application Data

(63) Continuation-in-part of application No. 16/124,137, filed on Sep. 6, 2018, now abandoned.

(51) Int. Cl.
| | |
|---|---|
| *B62J 1/06* | (2006.01) |
| *B62J 1/00* | (2006.01) |
| *B62K 19/36* | (2006.01) |
| *F15B 15/14* | (2006.01) |
| *B62J 1/08* | (2006.01) |
| *F15B 15/16* | (2006.01) |

(52) U.S. Cl.
CPC .............. *B62J 1/06* (2013.01); *B62J 1/00* (2013.01); *B62K 19/36* (2013.01); *B62J 2001/085* (2013.01); *F15B 15/149* (2013.01); *F15B 15/1428* (2013.01); *F15B 15/16* (2013.01); *F15B 2215/30* (2013.01)

(58) Field of Classification Search
None
See application file for complete search history.

(56) References Cited

U.S. PATENT DOCUMENTS

| | | | | |
|---|---|---|---|---|
| 4,294,133 A | * | 10/1981 | Hurley | F16C 1/105 |
| | | | | 24/528 |
| 2017/0341692 A1 | * | 11/2017 | Shirai | B62K 19/36 |
| 2018/0037294 A1 | * | 2/2018 | Kurotobi | B62K 25/286 |
| 2019/0300085 A1 | | 10/2019 | Shirai et al. | |

FOREIGN PATENT DOCUMENTS

| | | | |
|---|---|---|---|
| AU | B-10353/92 | * | 2/1991 |
| AU | 647572 B2 | | 3/1994 |
| CN | 212679659 | * | 3/2021 |
| DE | 102019106615 | | 10/2019 |
| EP | 2457811 A1 | | 5/2012 |
| JP | 5878869 B2 | | 2/2012 |
| WO | WO 03/003137 | | 1/2003 |

OTHER PUBLICATIONS

CN212679659 partial translation, Fu, Mar. 2021. (Year: 2021).*

* cited by examiner

*Primary Examiner* — Sarah B Mcpartlin
(74) *Attorney, Agent, or Firm* — Mori & Ward, LLP

(57) ABSTRACT

An actuation device for a human-powered vehicle comprises a base member, a movable member, and an actuator. The movable member is movably provided on the base member. The actuator is configured to be actuated by stimulation including at least one of electric stimulation and heat stimulation so as to move the movable member relative to the base member in a first direction by pulling the movable member.

32 Claims, 38 Drawing Sheets

ACTUATION DEVICE AND TELESCOPIC APPARATUS

CROSS-REFERENCE TO RELATED APPLICATIONS

The present application is a continuation-in-part application of the U.S. patent application Ser. No. 16/124,137 filed Sep. 6, 2018. The contents of this application are incorporated herein by reference in their entirety.

BACKGROUND OF THE INVENTION

Field of the Invention

The present invention relates to an actuation device and a telescopic apparatus.

Discussion of the Background

A human-powered vehicle includes an actuation device to actuate a vehicle component.

SUMMARY OF THE INVENTION

In accordance with a first aspect of the present invention, an actuation device for a human-powered vehicle comprises a base member, a movable member, and an actuator. The movable member is movably provided on the base member. The actuator is configured to be actuated by stimulation including at least one of electric stimulation and heat stimulation so as to move the movable member relative to the base member in a first direction by pulling the movable member.

With the actuation device according to the first aspect, it is possible to move the movable member relative to the base member in the first direction by applying the stimulation to the actuator.

In accordance with a second aspect of the present invention, the actuation device according to the first aspect is configured so that the actuator is configured to deform to pull the movable member in accordance with the stimulation.

With the actuation device according to the second aspect, it is possible to pull the movable member using deformation of the actuator.

In accordance with a third aspect of the present invention, the actuation device according to the first or second aspect is configured so that the actuator is configured to be actuated by the stimulation so as to move the movable member relative to the base member in a second direction different from the first direction.

With the actuation device according to the third aspect, it is possible to move the movable member relative to the base member in the first direction and the second direction by applying the stimulation to the actuator.

In accordance with a fourth aspect of the present invention, the actuation device according to the third aspect is configured so that the second direction is opposite to the first direction.

With the actuation device according to the fourth aspect, it is possible to move the movable member relative to the base member in the first direction and the second direction which is opposite to the first direction by applying the stimulation to the actuator.

In accordance with a fifth aspect of the present invention, the actuation device according to any one of the first to fourth aspects is configured so that the actuator includes a shape-memory alloy configured to deform to pull the movable member in accordance with the stimulation.

With the actuation device according to the fifth aspect, it is possible to simplify the structure of the actuation device.

In accordance with a sixth aspect of the present invention, the actuation device according to any one of the first to fourth aspects is configured so that the actuator includes a nylon fiber configured to deform to pull the movable member in accordance with the stimulation.

With the actuation device according to the sixth aspect, it is possible to simplify the structure of the actuation device.

In accordance with a seventh aspect of the present invention, the actuation device according to any one of the first to sixth aspects is configured so that the actuator includes an actuation wire configured to vary a total length of the actuation wire to pull the movable member in accordance with a change in the stimulation.

With the actuation device according to the seventh aspect, it is possible to simplify the structure of the actuation device.

In accordance with an eighth aspect of the present invention, the actuation device according to the seventh aspect is configured so that the actuation wire is configured to decrease the total length of the actuation wire to pull the movable member in accordance with an increase in the stimulation. The actuation wire is configured to increase the total length of the actuation wire to release a pulling force of the actuation wire in accordance with a decrease in the stimulation.

With the actuation device according to the eighth aspect, it is possible to move the movable member relative to the base member by pulling the movable member with the actuation wire. This can simplify the structure of the actuation device.

In accordance with a ninth aspect of the present invention, the actuation device according to the seventh or eighth aspect is configured so that the actuation wire includes a first wire end portion, a second wire end portion, and an intermediate portion. The first wire end portion is coupled to the base member. The second wire end portion is opposite to the first wire end portion. The second wire end portion is coupled to the base member. The intermediate portion is provided between the first wire end portion and the second wire end portion. The intermediate portion is coupled to the movable member.

With the actuation device according to the ninth aspect, it is possible to make the actuation wire longer.

In accordance with a tenth aspect of the present invention, the actuation device according to any one of the seventh to ninth aspects further comprises an adjustment structure configured to adjust a tension of the actuation wire.

With the actuation device according to the tenth aspect, it is possible to maintain responsiveness of the actuation device.

In accordance with an eleventh aspect of the present invention, the actuation device according to the tenth aspect is configured so that the movable member is movable relative to the base member between a first initial position and a first actuated position. The adjustment structure is configured to change the first initial position of the movable member relative to the base member.

With the actuation device according to the eleventh aspect, it is possible to maintain responsiveness of the actuation device with a simple structure.

In accordance with a twelfth aspect of the present invention, the actuation device according to the eleventh aspect is configured so that the movable member includes a first movable part and a second movable part. The adjustment structure includes a threaded hole and an adjustment member. The threaded hole is provided on one of the first movable part and the second movable part. The adjustment member is threaded into the threaded hole so as to change relative position between the first movable part and the second movable part.

With the actuation device according to the twelfth aspect, it is possible to maintain responsiveness of the actuation device with a simple structure.

In accordance with a thirteenth aspect of the present invention, the actuation device according to the seventh to twelfth aspects further comprises a positioning structure configured to maintain a position of the movable member.

With the actuation device according to the thirteenth aspect, the positioning structure can reduce an amount of stimulation.

In accordance with a fourteenth aspect of the present invention, the actuation device according to the thirteenth aspect is configured so that the actuation wire is configured to pull the movable member from a first initial position to a first actuated position. The positioning structure is configured to position the movable member relative to the base member in the first actuated position after the actuation wire pulls the movable member from the first initial position to the first actuated position.

With the actuation device according to the fourteenth aspect, the positioning structure can reduce an amount of stimulation if the movable member is positioned in the first actuated position.

In accordance with a fifteenth aspect of the present invention, the actuation device according to the fourteenth aspect is configured so that the positioning structure includes a lock member engageable with the movable member to position the movable member in the first actuated position.

With the actuation device according to the fifteenth aspect, the positioning structure can reduce an amount of stimulation if the movable member is positioned in the first actuated position with a simple structure.

In accordance with a sixteenth aspect of the present invention, the actuation device according to the fifteenth aspect is configured so that the movable member includes a first engagement part. The lock member includes a second engagement part engageable with the first engagement part to position the movable member in the first actuated position.

With the actuation device according to the sixteenth aspect, it is possible to simplify the positioning structure.

In accordance with a seventeenth aspect of the present invention, the actuation device according to the sixteenth aspect is configured so that the actuator includes an additional actuation wire configured to vary a total length of the additional actuation wire to move the movable member in a second direction opposite to the first direction.

With the actuation device according to the seventeenth aspect, it is possible to smoothly move the movable member relative to the base member in both the first direction and the second direction using the actuation wire and the additional actuation wire.

In accordance with an eighteenth aspect of the present invention, the actuation device according to the seventeenth aspect is configured so that the additional actuation wire configured to disengage the second engagement part from the first engagement part.

With the actuation device according to the eighteenth aspect, it is possible to release the engagement between the first engagement part and the second engagement part using the additional actuation wire.

In accordance with a nineteenth aspect of the present invention, the actuation device according to the eighteenth aspect is configured so that the lock member is movably coupled to the base member between a lock position where the second engagement part is engaged with the first engagement part and a release position where the second engagement part is disengaged from the first engagement part. The additional actuation wire is configured to move the lock member from the lock position to the release position relative to the base member.

With the actuation device according to the nineteenth aspect, it is possible to reliably release the engagement between the first engagement part and the second engagement part using the additional actuation wire.

In accordance with a twentieth aspect of the present invention, the actuation device according to the nineteenth aspect is configured so that the positioning structure includes a release member movable relative to the movable member between a second initial position where the lock member is positioned in the lock position and a second actuated position where the release member is engaged with the lock member to position the lock member in the release position.

With the actuation device according to the twentieth aspect, it is possible to more reliably release the engagement between the first engagement part and the second engagement part using the additional actuation wire and the release member.

In accordance with a twenty-first aspect of the present invention, the actuation device according to the twentieth aspect is configured so that the additional actuation wire is configured to pull the release member from the second initial position to the second actuated position in the second direction.

With the actuation device according to the twenty-first aspect, it is possible to move the release member by pulling the release member with the additional actuation wire.

In accordance with a twenty-second aspect of the present invention, the actuation device according to the twenty-first aspect is configured so that the additional actuation wire is configured to decrease the total length of the additional actuation wire to pull the release member in accordance with an increase in the stimulation. The additional actuation wire is configured to increase the total length of the additional actuation wire to release a pulling force of the additional actuation wire in accordance with a decrease in the stimulation.

With the actuation device according to the twenty-second aspect, it is possible to apply a pulling force to the release member with a simple structure.

In accordance with a twenty-third aspect of the present invention, the actuation device according to the twentieth or twenty-second aspect is configured so that the additional actuation wire includes a first additional wire end portion, a second additional wire end portion, and an additional intermediate portion. The first additional wire end portion is coupled to the base member. The second additional wire end portion is opposite to the first additional wire end portion. The second additional wire end portion is coupled to the base member. The additional intermediate portion is provided between the first additional wire end portion and the second additional wire end portion. The additional intermediate portion is coupled to the release member.

With the actuation device according to the twenty-third aspect, it is possible to make the additional actuation wire longer.

In accordance with a twenty-fourth aspect of the present invention, the actuation device according to any one of the seventeenth to twenty-third aspect further comprises an additional adjustment structure configured to adjust a tension of the additional actuation wire.

With the actuation device according to the twenty-fourth aspect, it is possible to maintain responsiveness of the additional actuation device.

In accordance with a twenty-fifth aspect of the present invention, the actuation device according to the twenty-fourth aspect is configured so that the additional adjustment structure includes an adjustment portion, a threaded hole, and an adjustment member. The adjustment portion is provided on the base member. The adjustment portion is coupled to the additional actuation wire. The threaded hole is provided on the adjustment portion. The adjustment member is threaded into the threaded hole so as to change relative position between the adjustment portion and the base member.

With the actuation device according to the twenty-fifth aspect, it is possible to easily adjust the tension of the additional actuation wire.

In accordance with a twenty-sixth aspect of the present invention, the actuation device according to any one of the seventh to twenty-fifth aspects is configured so that the base member includes a groove extending along the first direction. The actuation wire is provided in the groove. The groove includes an inclined groove inclined relative to the first direction.

With the actuation device according to the twenty-sixth aspect, the inclined groove can increase a contact area between the groove and the actuation wire, increasing efficiency of heat transfer from the actuation wire to the base member. This can improve cooling efficiency of the actuation device.

In accordance with a twenty-seventh aspect of the present invention, the actuation device according to the twenty-sixth aspect is configured so that the groove includes a first groove and a second groove which is separate from the first groove. At least one of the first groove and the second groove includes the inclined groove.

With the actuation device according to the twenty-seventh aspect, the inclined groove can reliably increase the contact area between the groove and the actuation wire. This can reliably improve cooling efficiency of the actuation device.

In accordance with a twenty-eighth aspect of the present invention, the actuation device according to the twenty-seventh aspect is configured so that the first groove faces in a third direction perpendicular to the first direction. The second groove faces in the third direction.

With the actuation device according to the twenty-eighth aspect, it is possible to effectively improve cooling efficiency of the actuation device.

In accordance with a twenty-ninth aspect of the present invention, the actuation device according to any one of the first to twenty-eighth aspects is configured so that the base member includes a thermal conductor having electric insulation.

With the actuation device according to the twenty-ninth aspect, the thermal conductor of the base member can improve cooling efficiency of the actuation device.

In accordance with a thirtieth aspect of the present invention, the actuation device according to any one of the first to twenty-ninth aspects is configured so that the base member has a first coefficient of heat transfer. The movable member has a second coefficient of heat transfer. The first coefficient of heat transfer is higher than the second coefficient of heat transfer.

With the actuation device according to the thirtieth aspect, it is possible to improve cooling efficiency of the actuation device using the base member.

In accordance with a thirty-first aspect of the present invention, a telescopic apparatus comprises the actuation device according to any one of the first to thirtieth aspects, the first tube configured to be coupled to the base member, and the second tube telescopically and movably coupled to the first tube.

With the telescopic apparatus according to the thirtieth aspect, it is possible to operate the telescopic apparatus using the actuation device.

In accordance with a thirty-second aspect of the present invention, the telescopic apparatus according to the thirty-first aspect further comprises a hydraulic structure. The hydraulic structure includes a first hydraulic chamber, a second hydraulic chamber, and a valve. The second hydraulic chamber is configured to be in fluid communication with the first hydraulic chamber. The valve is configured to control a fluid communication state between the first hydraulic chamber and the second hydraulic chamber. The movable member is movable relative to the hydraulic structure to operate the valve.

With the telescopic apparatus according to the thirty-second aspect, it is possible to operate the valve of the hydraulic structure using the actuation device.

In accordance with a thirty-third aspect of the present invention, the actuation device according to the thirty-first or thirty-second aspect is configured so that the telescopic apparatus is a height adjustable seatpost assembly.

With the telescopic apparatus according to the thirty-third aspect, it is possible to apply the actuation device to the height adjustable seatpost assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
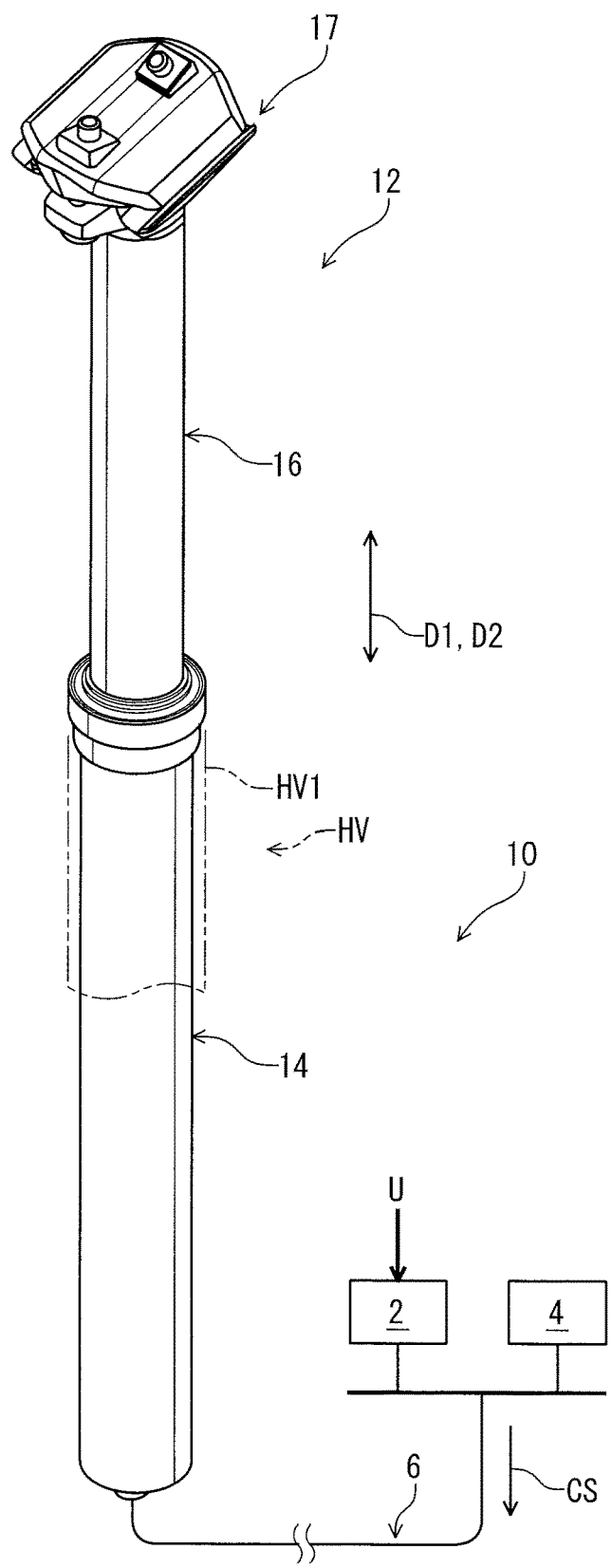
FIG. 1 is a perspective view of a telescopic apparatus in accordance with a first embodiment, with a schematic block diagram of a telescopic actuation system.

The embodiment(s) will now be described with reference to the accompanying drawings, wherein like reference numerals designate corresponding or identical elements throughout the various drawings.

First Embodiment

Referring initially to FIG. 1, a telescopic actuation system 10 includes a telescopic apparatus 12 in accordance with a first embodiment. The telescopic apparatus 12 for a human-powered vehicle HV comprises a first tube 14 and a second tube 16. The second tube 16 is telescopically and movably coupled to the first tube 14. The first tube 14 and the second tube 16 are movable relative to each other in a telescopic direction D1. The telescopic apparatus 12 further comprises a saddle mounting structure 17 to fixedly mount a saddle to one of the first tube 14 and the second tube 16. In this embodiment, the saddle mounting structure 17 is attached to the second tube 16 to fixedly mount the saddle to the second tube 16. The first tube 14 is configured to be mounted to a vehicle body HV1 of the human-powered vehicle HV. However, the saddle mounting structure 17 can be attached to the first tube 14 to fixedly mount the saddle to the first tube 14. In such an embodiment, the second tube 16 is configured to be mounted to the vehicle body HV1 of the human-powered vehicle HV.

Figure 2:
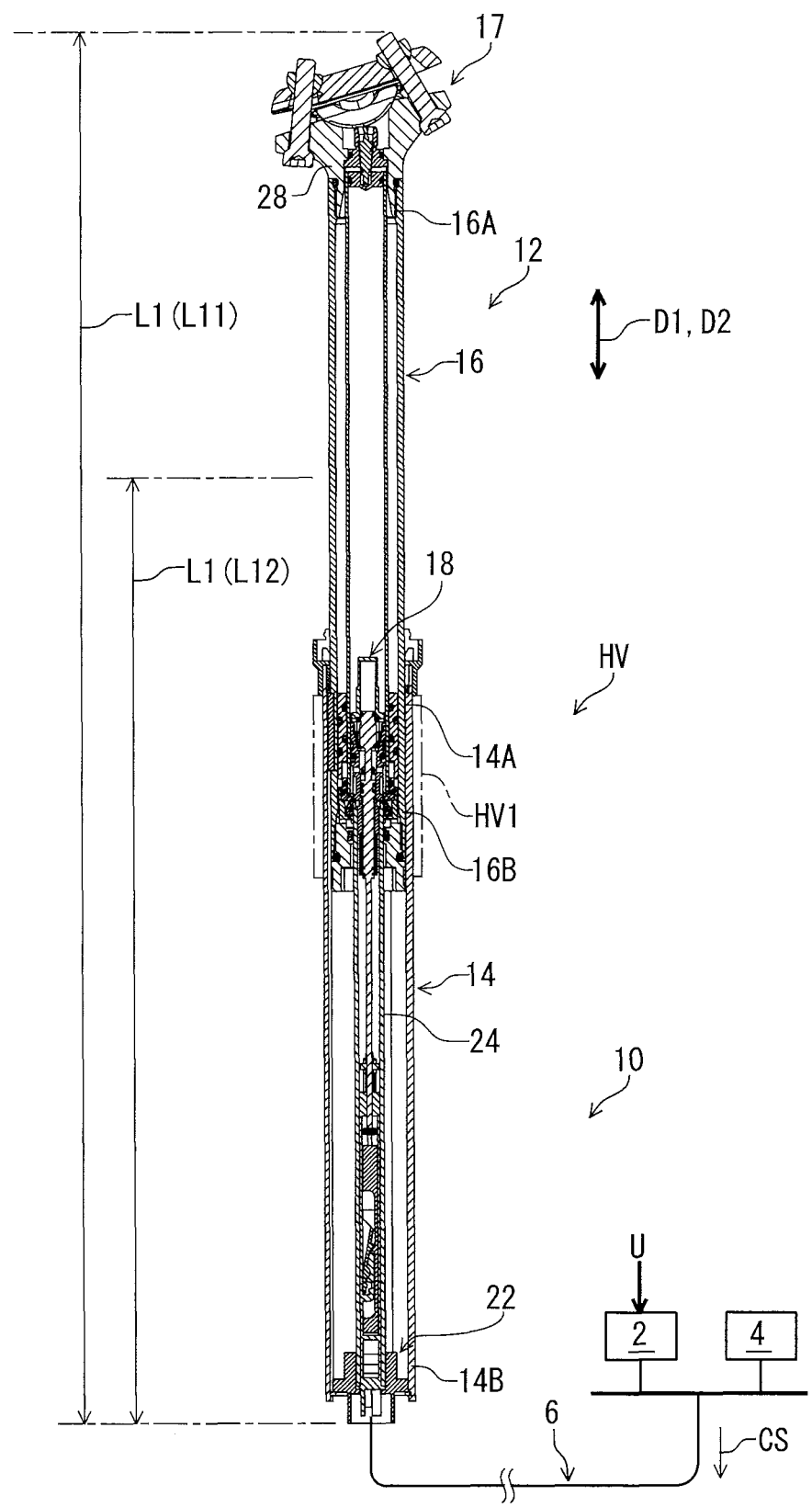
FIG. 2 is a cross-sectional view of the telescopic apparatus taken along line II-II of FIG. 1, with the schematic block diagram of the telescopic actuation system.

As seen in FIG. 2, the second tube 16 is telescopically coupled to the first tube 14 to vary a total length L1 of the telescopic apparatus 12. The telescopic apparatus 12 has a maximum total length L11 and a minimum total length L12. The first tube 14 includes a first end 14A and a first opposite end 14B. The first tube 14 extends between the first end 14A and the first opposite end 14B. The second tube 16 includes a second end 16A and a second opposite end 16B. The second tube 16 extends between the second end 16A and the second opposite end 16B. The second opposite end 16B is provided in the first tube 14. The first tube 14 is configured to be detachably attached to the vehicle body HV1 of the human-powered vehicle HV In this embodiment, the first end 14A is an upper end of the first tube 14 in a mounting state where the telescopic apparatus 12 is mounted to the vehicle body HV1 of the human-powered vehicle HV. The second end 16A is an upper end of the second tube 16 in the mounting state of the telescopic apparatus 12. The telescopic apparatus 12 is a height adjustable seatpost assembly. However, the telescopic apparatus 12 can be other devices such as a suspension.

For example, the human-powered vehicle HV is a vehicle to travel with a motive power including at least a human power of a user who rides the human-powered vehicle HV (i.e., rider). The human-powered vehicle HV has an arbitrary number of wheels. For example, the human-powered vehicle HV has at least one wheel. In this embodiment, the human-powered vehicle HV preferably has a smaller size than that of a four-wheeled automobile. However, the human-powered vehicle HV can have an arbitrary size. For example, the human-powered vehicle HV can have a larger size than that of the four-wheeled automobile. Examples of the human-powered vehicle HV include a bicycle, a tricycle, and a kick scooter. In this embodiment, the human-powered vehicle HV is a bicycle. An electric assisting system including an electric motor can be applied to the human-powered vehicle HV (e.g., the bicycle) to assist muscular motive power of the user. Namely, the human-powered vehicle HV can be an E-bike.

In the present application, the following directional terms "forward," "rearward," "left," "right," "upward," and "downward" as well as any other similar directional terms refer to those directions which are determined on the basis of the rider who sits on a saddle or seat of the human-powered vehicle HV with facing a steering or handlebar. Accordingly, these terms, as utilized to describe the telescopic apparatus 12, should be interpreted relative to the human-powered vehicle HV equipped with the telescopic apparatus 12 as used in an upright riding position on a horizontal surface.

Figure 3:
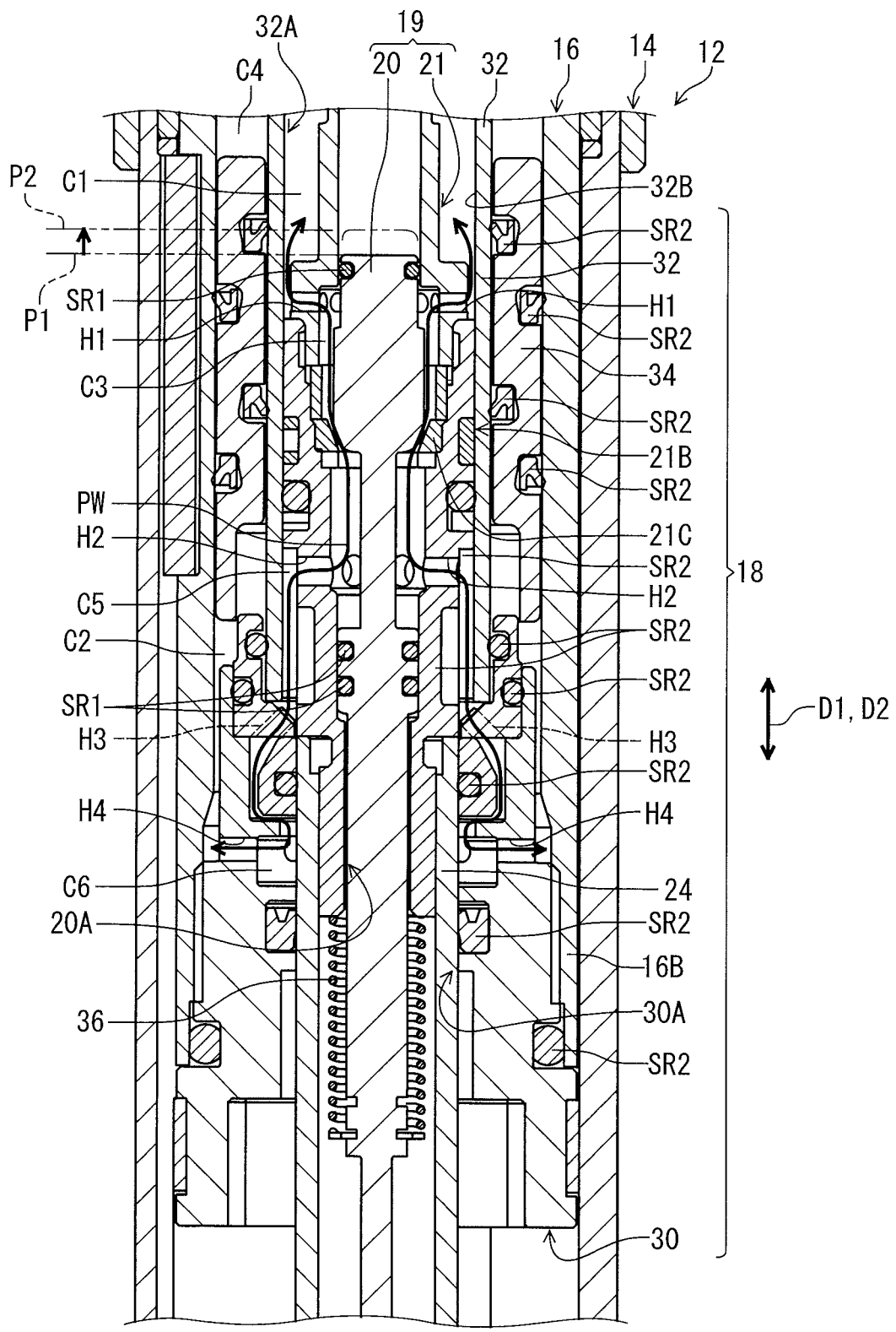
FIG. 3 is a partial cross-sectional view of the telescopic apparatus illustrated in FIG. 2.

As seen in FIG. 3, the telescopic apparatus 12 further comprises a hydraulic structure 18. The hydraulic structure 18 includes a first hydraulic chamber C1, a second hydraulic chamber C2, and a valve 19. The second hydraulic chamber C2 is configured to be in fluid communication with the first hydraulic chamber C1. The valve 19 is configured to control a fluid communication state between the first hydraulic chamber C1 and the second hydraulic chamber C2.

The hydraulic structure 18 includes a passageway PW. The passageway PW is provided between the first hydraulic chamber C1 and the second hydraulic chamber C2. The valve 19 is configured to change the fluid communication state of the hydraulic structure 18 between a closed state where the valve 19 closes the passageway PW and an open state where the valve 19 opens the passageway PW. The first hydraulic chamber C1 and the second hydraulic chamber C2 are filled with a substantially incompressible fluid (e.g., oil).

The valve 19 includes a valve rod 20 and a valve structure 21. The valve 19 is movable relative to the valve structure 21 between a closed position P1 and an open position P2 in the telescopic direction D1. The hydraulic structure 18 is in the closed state when the valve 19 is in the closed position P1. The hydraulic structure 18 is in the open state when the valve 19 is in the open position P2.

Figure 4:
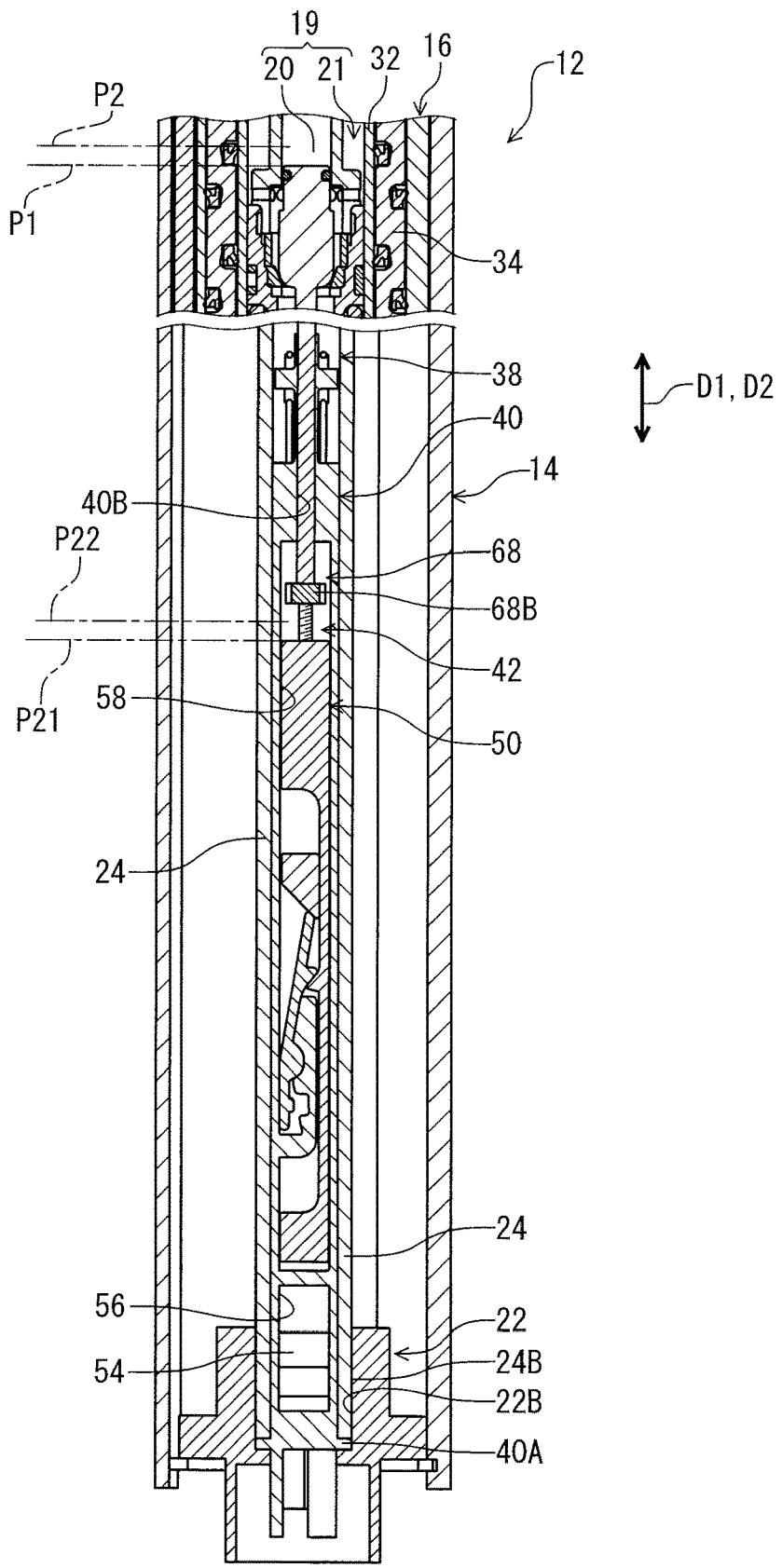
FIG. 4 is a partial cross-sectional view of the telescopic apparatus illustrated in FIG. 2.

As seen in FIG. 4, the hydraulic structure 18 includes a first support 22 and a first inner tube 24. The first support 22 is secured to the first opposite end 14B of the first tube 14. The first inner tube 24 is secured to the first support 22 and provided in the first tube 14. The first inner tube 24 extends from the first support 22 in the telescopic direction D1.

As seen in FIG. 3, the valve structure 21 is secured to an end of the first inner tube 24. The valve structure 21 includes an internal cavity 21A. The first inner tube 24 includes a cavity 24A. The valve 19 is movably provided in the internal cavity 21A and the cavity 24A. The valve 19 and the valve structure 21 define a valve chamber C3 in the internal cavity 21A.

Figure 5:
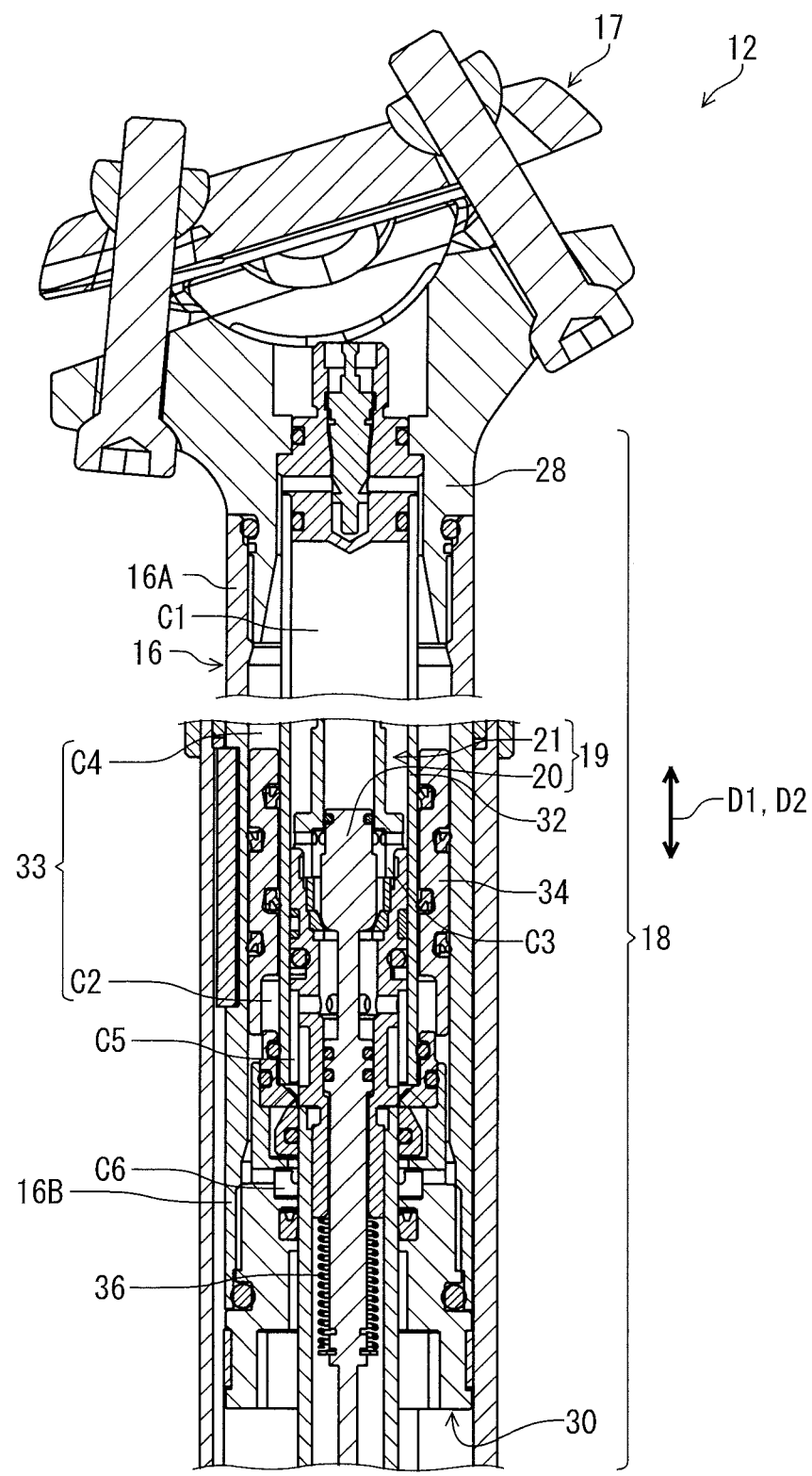
FIG. 5 is a partial cross-sectional view of the telescopic apparatus illustrated in FIG. 2.

As seen in FIG. 5, the hydraulic structure 18 includes a second support 28, an intermediate support 30, and a second inner tube 32. The second support 28 is secured to the second end 16A of the second tube 16. The second support 28 is integrally provided with the saddle mounting structure 17 and couples the saddle mounting structure 17 to the second tube 16. The intermediate support 30 is secured to the second opposite end 16B of the second tube 16. The second inner tube 32 is provided in the second tube 16 and disposed between the second support 28 and the intermediate support 30. The second support 28 and the intermediate support 30 are secured to the second tube 16 to hold the second inner tube 32 in the second tube 16. The second tube 16, the second inner tube 32, the second support 28, and the intermediate support 30 define an internal space 33.

The hydraulic structure 18 includes a floating piston 34. The floating piston 34 is movably provided in the internal space 33 to divide the internal space 33 into the second hydraulic chamber C2 and a biasing chamber C4. The biasing chamber C4 is filled with a compressible fluid (e.g., gas such as air) to produce biasing force to lengthen the telescopic apparatus 12. The compressible fluid is compressed in the biasing chamber C4 to produce the biasing force in a state where the total length L1 of the telescopic apparatus 12 is the maximum total length L11 (FIG. 2).

As seen in FIG. 3, the intermediate support 30 includes a support opening 30A. The first inner tube 24 extend through the support opening 30A. The valve structure 21 is movably provided in a cavity 32A of the second inner tube 32. The valve structure 21 is in slidable contact with an inner peripheral surface 32B of the second inner tube 32. As seen in FIG. 5, the valve structure 21, the second inner tube 32, and the second support 28 define the first hydraulic chamber C1 in the second inner tube 32.

As seen in FIG. 3, the first inner tube 24, the valve structure 21, the second inner tube 32, and the intermediate support 30 define a first intermediate chamber C5 and a second intermediate chamber C6. The valve structure 21 includes a plurality of first holes H1 and a plurality of second holes H2. The plurality of first holes H1 connects the first hydraulic chamber C1 to the valve chamber C3. The plurality of second holes H2 connects the valve chamber C3 to the first intermediate chamber C5. The intermediate support 30 includes a plurality of third holes H3 and a plurality of fourth holes H4. The plurality of third holes H3 connects the first intermediate chamber C5 to the second intermediate chamber C6. The plurality of fourth holes H4 connects the second intermediate chamber C6 to the second hydraulic chamber C2. The passageway PW includes the plurality of first holes H1, the valve chamber C3, the plurality of second holes H2, the first intermediate chamber C5, the plurality of third holes H3, the second intermediate chamber C6, and the plurality of fourth holes H4.

The valve structure 21 includes a valve base 21B and a valve seat 21C. The valve base 21B includes the plurality of first holes H1 and the plurality of second holes H2. The valve seat 21C is attached to the valve base 21B to be contactable with the valve rod 20. The valve 19 is in contact with the valve seat 21C to close the passageway PW in the closed state where the valve 19 is in the closed position P1. The valve 19 is spaced apart from the valve seat 21C to open the passageway PW in the open state where the valve 19 is in the open position P2.

The telescopic apparatus 12 comprises a biasing member 36 to bias the valve 19 toward the closed position P1. The biasing member 36 is provided in the first inner tube 24. For example, the biasing member 36 includes a spring. The valve 19 includes a plurality of seal rings SR1. The hydraulic structure 18 includes a plurality of seal rings SR2.

The substantially incompressible fluid does not flow between the first hydraulic chamber C1 and the second hydraulic chamber C2 in the closed state where the valve 19 closes the passageway PW. Thus, in the closed state, the first tube 14 and the second tube 16 are fixedly positioned relative to each other in the telescopic direction D1.

The substantially incompressible fluid can flow between the first hydraulic chamber C1 and the second hydraulic chamber C2 through the passageway PW in the open state where the valve 19 opens the passageway PW. For example, when the rider's weight is applied to the second tube 16 in the open state, the substantially incompressible fluid flows from the first hydraulic chamber C1 to the second hydraulic chamber C2 through the passageway PW. Thus, the floating piston 34 is pressed toward the biasing chamber C4 relative to the first tube 14, increasing a volume of the second hydraulic chamber C2 while the compressible fluid is compressed in the biasing chamber C4. This downwardly moves the second tube 16 relative to the first tube 14 against the basing force of the biasing chamber C4 while the rider's weight is applied to the second tube 16, allowing the rider to lower the saddle using the rider's weight in the open state.

The compressible fluid compressed in the biasing chamber C4 biases the second tube 16 to upwardly move relative to the first tube 14 in the telescopic direction D1 and to downwardly move the floating piston 34 in the telescopic direction D1. When the rider's weight is released from the second tube 16 in the open state, the substantially incompressible fluid flows from the second hydraulic chamber C2 to the first hydraulic chamber C1 through the passageway PW because of the biasing force of the biasing chamber C4. This upwardly moves the second tube 16 relative to the first tube 14 while the rider's weight is released from the second tube 16, allowing the rider to lift the saddle by releasing the rider's weight in the open state.

As seen in FIG. 4, the telescopic apparatus 12 comprises an actuation device 38. The actuation device 38 is provided in the first inner tube 24. The actuation device 38 is provided between the hydraulic structure 18 and the first support 22 in the telescopic direction D1. The actuation device 38 is provided in the first tube 14 to move the valve 19 relative to the first tube 14 in the telescopic direction D1.

The actuation device 38 for the human-powered vehicle HV comprises a base member 40 and a movable member 42. The movable member 42 is movably provided on the base member 40. In this embodiment, the first tube 14 is configured to be coupled to the base member 40. The base member 40 is secured to the first support 22 and is stationary relative to the first tube 14, the first support 22, and the first inner tube 24 in the telescopic direction D1. The first inner tube 24 includes an external thread 24B provided at an end of the first inner tube 24. The first support 22 includes a threaded hole 22B. The external thread 24B of the first inner tube 24 is engaged in the threaded hole 22B of the first support 22. The base member 40 includes a flange 40A. The flange 40A of the base member 40 is held between the first inner tube 24 and the first support 22. However, the base member 40 can be configured to be coupled to the second tube 16 to be stationary relative to the second tube 16 in the telescopic direction D1.

The movable member 42 is movable relative to the hydraulic structure 18 to operate the valve 19. The movable member 42 is movable relative to the base member 40 between a first initial position P21 and a first actuated position P22. In this embodiment, the movable member 42 is movable relative to the base member 40 in an actuation direction D2 to move the valve rod 20 relative to the valve structure 21 in the telescopic direction D1. The valve rod 20 is in the closed position in a rest state where the movable member is in the first initial position P21. The valve rod 20 is in the open position in an operated state where the movable member 42 is in the actuated position. The actuation direction D2 is parallel to the telescopic direction D1 in a state where the actuation device 38 is mounted to the first tube 14. The base member 40 extends in the actuation direction D2. The movable member 42 extends in the actuation direction D2. The base member 40 includes a guide hole 40B extending in the actuation direction D2. The valve rod 20 extends through the guide hole 40B.

Figure 6:
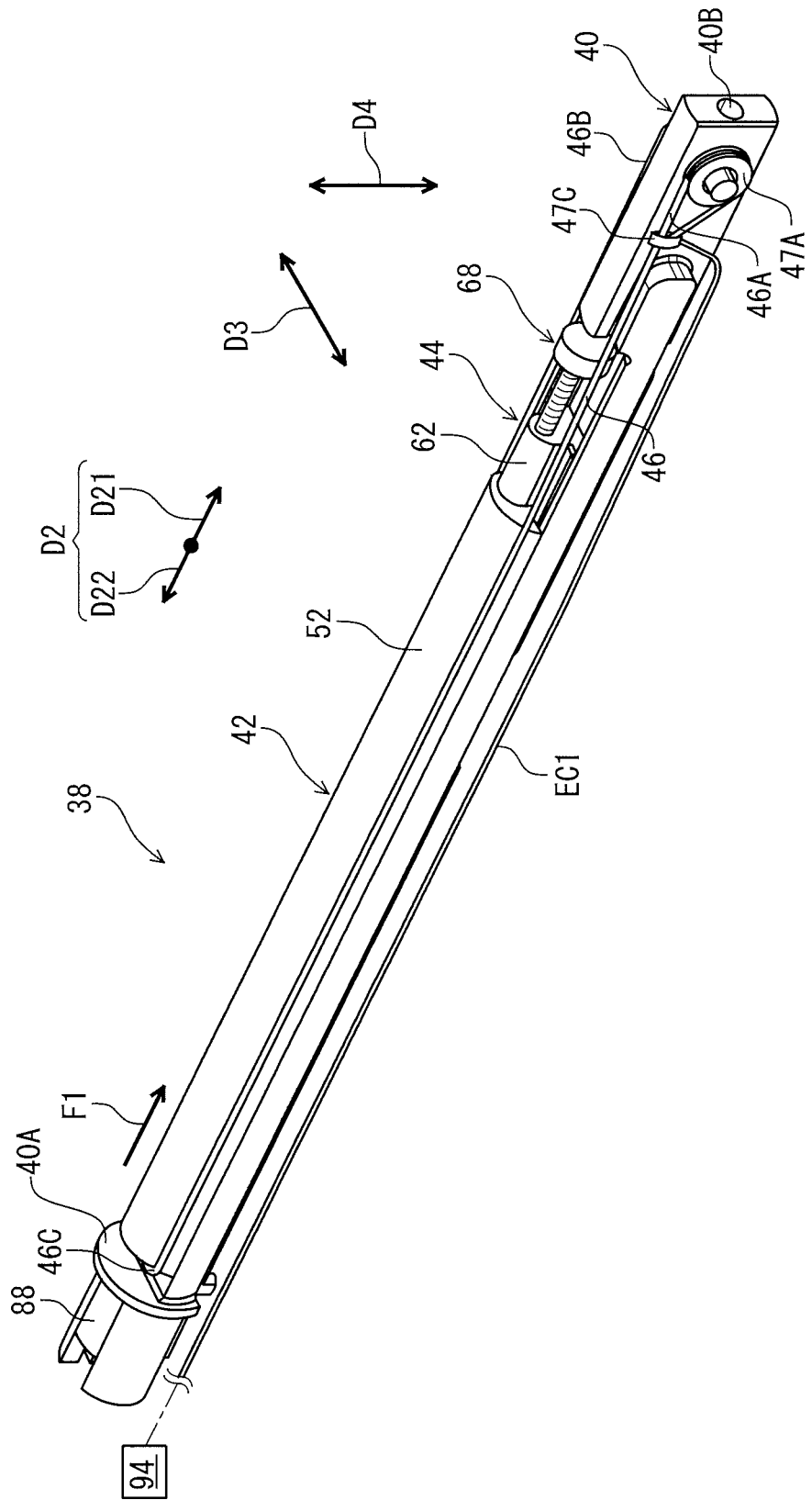
FIG. 6 is a perspective view of an actuation device of the telescopic apparatus illustrated in FIG. 2.

As seen in FIG. 6, the actuation device 38 comprises an actuator 44 configured to be actuated by stimulation including at least one of electric stimulation and heat stimulation so as to move the movable member 42 relative to the base member 40 in a first direction D21 by pulling the movable member 42. In this embodiment, the stimulation includes the electric stimulation, the heat stimulation, or both the electric stimulation and the heat stimulation. However, the stimulation can include other stimulations other than the electric stimulation and the heat stimulation. The first direction D21 is parallel to the actuation direction D2.

The actuator 44 is configured to deform to pull the movable member 42 in accordance with the stimulation. The actuator 44 is configured to be actuated by the stimulation so as to move the movable member 42 relative to the base member 40 in a second direction D22 different from the first direction D21. In this embodiment, the second direction D22 is opposite to the first direction D21. The second direction D22 is parallel to the actuation direction D2 and the first direction D21 and is an opposite direction of the first direction D21. However, the second direction D22 can be non-parallel to the first direction D21.

In this embodiment, the actuator 44 includes a shape-memory alloy configured to deform to pull the movable member 42 in accordance with the stimulation. The actuator 44 includes an actuation wire 46 configured to vary a total length of the actuation wire 46 to pull the movable member 42 in accordance with a change in the stimulation. The actuation wire 46 is made of the shape-memory alloy. Examples of the shape-memory alloy include a biometal fiber. However, the actuator 44 can include other materials other than the shape-memory alloy instead of or in addition to the shape-memory alloy. The actuation wire 46 can be made of other materials other than the shape-memory alloy instead of or in addition to the shape-memory alloy. For example, the actuator 44 can include a nylon fiber configured to deform to pull the movable member 42 in accordance with the stimulation. The actuation wire 46 can be made of the nylon fiber.

The actuation wire 46 is configured to decrease the total length of the actuation wire 46 to pull the movable member 42 in accordance with an increase in the stimulation. The actuation wire 46 is configured to increase the total length of the actuation wire 46 to release a pulling force F1 of the actuation wire 46 in accordance with a decrease in the stimulation. The actuation wire 46 is configured to pull the movable member 42 from the first initial position P21 to the first actuated position P22.

The actuation wire 46 includes a first wire end portion 46A, a second wire end portion 46B, and an intermediate portion 46C. The first wire end portion 46A is coupled to the base member 40. The second wire end portion 46B is opposite to the first wire end portion 46A. The second wire end portion 46B is coupled to the base member 40. The intermediate portion 46C is provided between the first wire end portion 46A and the second wire end portion 46B. The intermediate portion 46C is coupled to the movable member 42.

Figure 7:
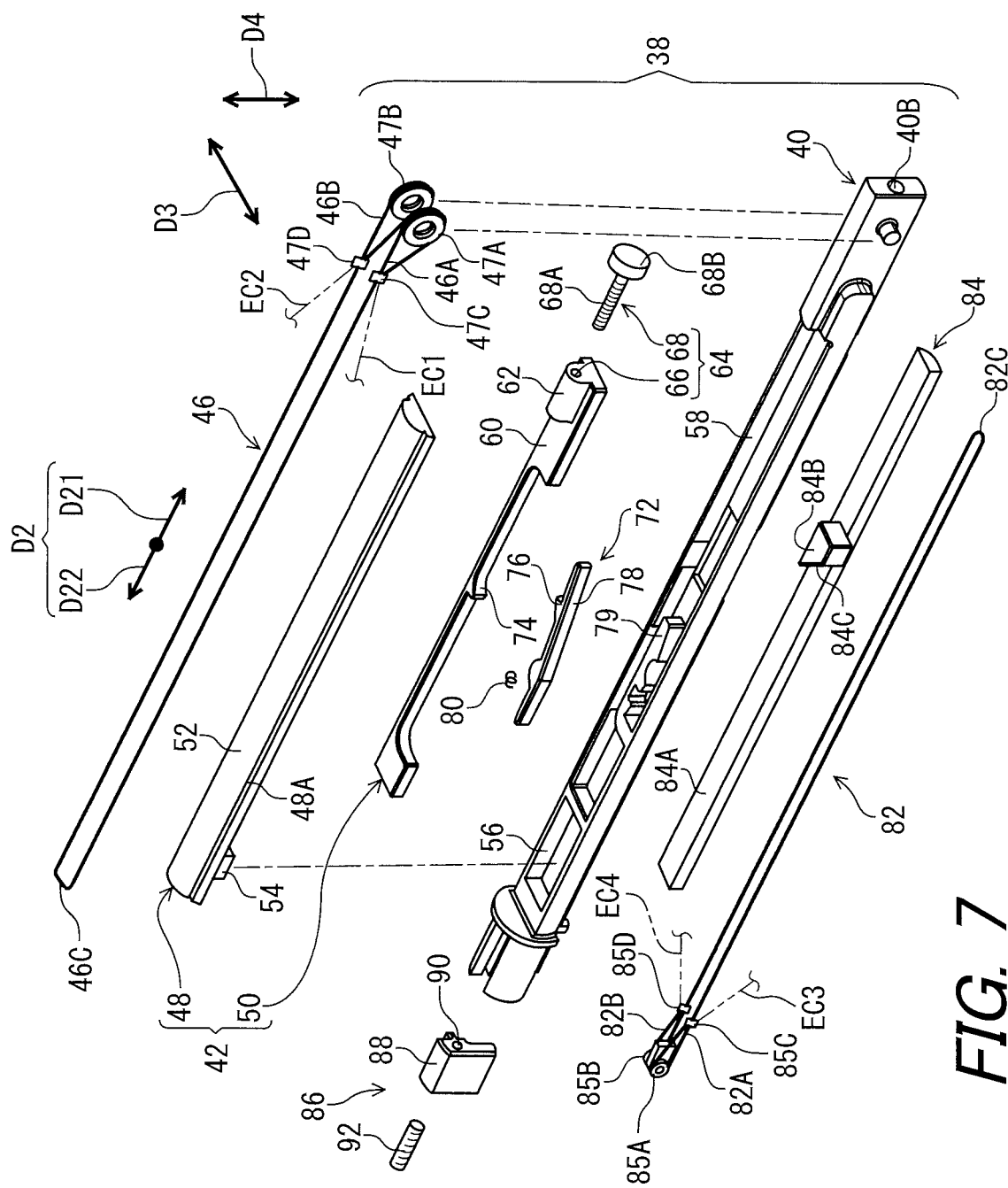
FIG. 7 is an exploded perspective view of the actuation device of the telescopic apparatus illustrated in FIG. 2.

As seen in FIG. 7, the first wire end portion 46A is spaced apart from the second wire end portion 46B in a first perpendicular direction D3 perpendicular to the actuation direction D2. The intermediate portion 46C extends from the first wire end portion 46A and the second wire end portion 46B in the actuation direction D2. The actuation device 38 comprises a first wire coupling member 47A and a second wire coupling member 47B. The first wire coupling member 47A and the second wire coupling member 47B are rotatably attached to the base member 40. The first wire end portion 46A is wound around the first wire coupling member 47A and is secured to an electric cable EC1 with a crimp terminal 47C. The second wire end portion 46B is wound around the second wire coupling member 47B and is secured to an electrical cable EC2 with a crimp terminal 47D.

Figure 8:
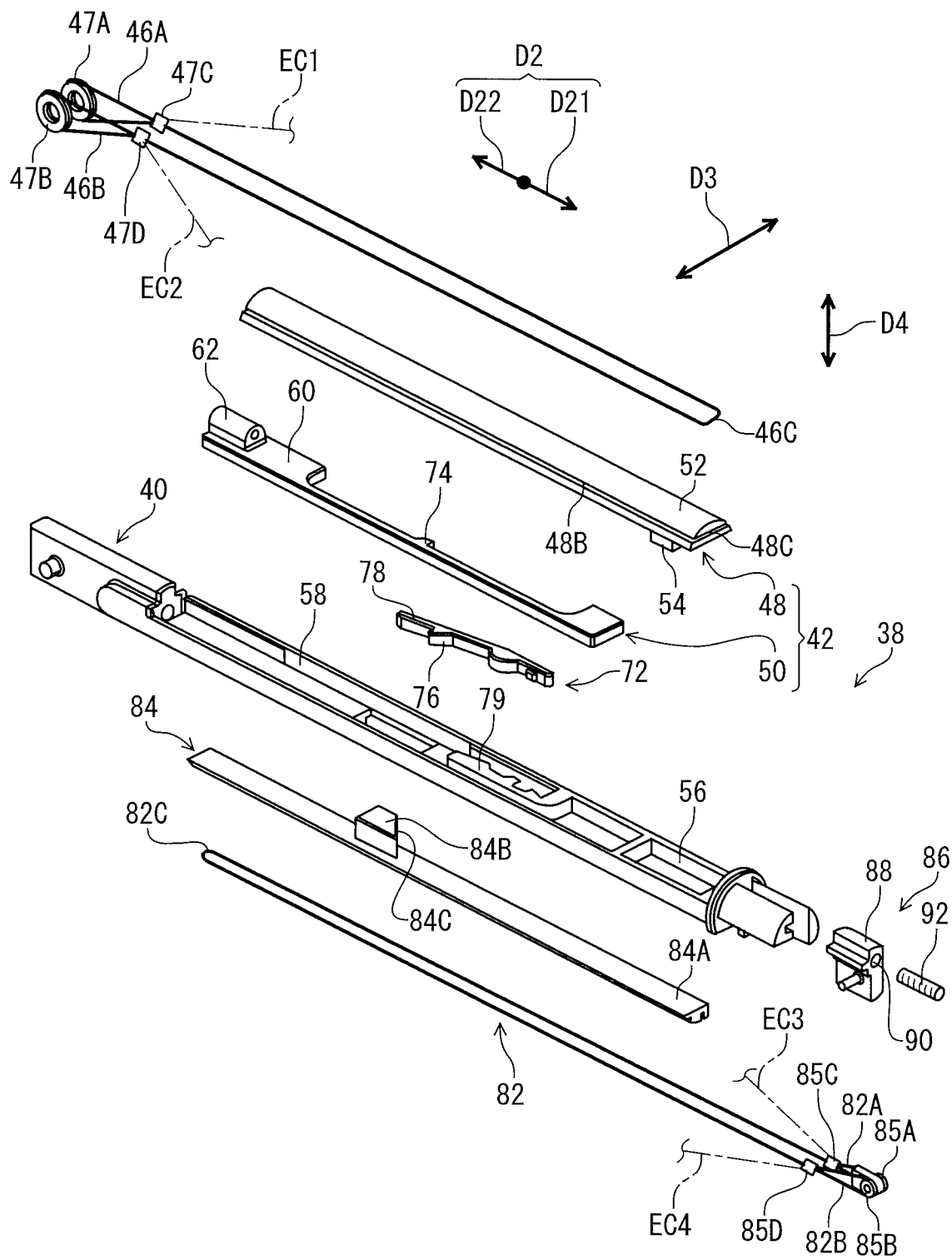
FIG. 8 is another exploded perspective view of the actuation device of the telescopic apparatus illustrated in FIG. 2.

As seen in FIGS. 7 and 8, the movable member 42 includes a first movable part 48 and a second movable part 50. The first movable part 48 includes a first groove 48A, a second groove 48B, and a third groove 48C. The first groove 48A and the second groove 48B extend in the actuation direction D2. The third groove 48C extends in the first perpendicular direction D3. The third groove 48C connects the first groove 48A to the second groove 48B. The actuation wire 46 is provided in the first groove 48A, the second groove 48B, and the third groove 48C. In this embodiment, the first movable part 48 is a separate member from the second movable part 50. However, the first movable part 48 can be integrally provided with the second movable part 50 as a one-piece unitary member.

The first movable body 52 includes the first groove 48A, the second groove 48B, and the third groove 48C. The first movable body 52 extends in the actuation direction D2. The first protrusion 54 extends from the first movable body 52 in a second perpendicular direction D4 perpendicular to both the actuation direction D2 and the first perpendicular direction D3. The base member 40 includes a first guide recess 56 and a second guide recess 58. The first protrusion 54 is movably provided in the first guide recess 56. The second movable part 50 is movably provided in the second guide recess 58. The second movable part 50 is provided between the first movable part 48 and the base member in the second perpendicular direction D4.

The second movable part 50 includes a second movable body 60 and a second protrusion 62. The second movable body 60 extends in the actuation direction D2. The second protrusion extends from the second movable body 60 in the second perpendicular direction D4. As seen in FIG. 6, the first movable part 48 is in contact with the second protrusion. Thus, the first movable part 48 and the second movable part 50 are movable integrally with each other in the first direction D21.

In this embodiment, the actuation device 38 further comprises an adjustment structure 64 configured to adjust a tension of the actuation wire 46. The adjustment structure 64 is configured to change the first initial position P21 of the movable member 42 relative to the base member 40. The adjustment structure 64 includes a threaded hole 66 and an adjustment member 68. The adjustment member 68 is threaded into the threaded hole 66 so as to change relative position between the first movable part 48 and the second movable part 50. The threaded hole 90 is provided on one of the first movable part 48 and the second movable part 50. In this embodiment, the threaded hole 90 is provided on the second movable part 50. The threaded hole 90 is provided on the second protrusion 62 of the second movable part 50. However, the threaded hole 90 can be provided on the first movable part 48.

The adjustment member 68 includes an externally threaded part 68A and a head part 68B. The externally threaded part 68A is threadedly engaged in the threaded hole 66. The head part 68B is provided at an end of the externally threaded part 68A. The user operates the head part 68B to rotate the adjustment member 68 to change a position of the head part 68B relative to the movable member 42. As seen in FIG. 4, the head part 68B is in contact with the valve rod 20. The structure of the adjustment structure 64 is not limited to this embodiment.

Figure 9:
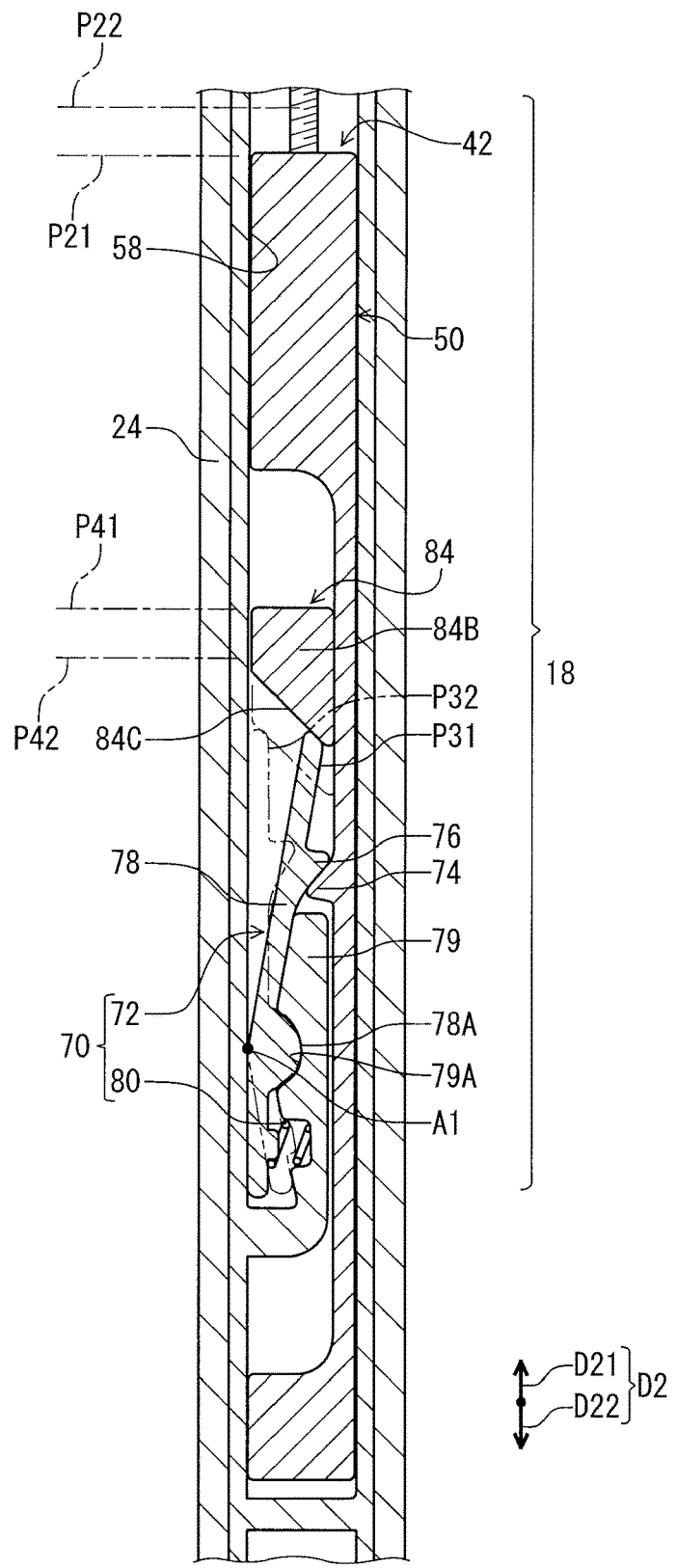
FIG. 9 is a partial cross-sectional view of the actuation device of the telescopic apparatus illustrated in FIG. 2.

As seen in FIG. 9, the actuation device 38 further comprises a positioning structure 70 configured to maintain a position of the movable member 42. The positioning structure 70 is configured to position the movable member 42 relative to the base member 40 in the first actuated position P22 after the actuation wire 46 pulls the movable member 42 from the first initial position P21 to the first actuated position P22.

In this embodiment, the positioning structure 70 includes a lock member 72 engageable with the movable member 42 to position the movable member 42 in the first actuated position P22. The movable member 42 includes a first engagement part 74. The lock member 72 includes a second engagement part 76 engageable with the first engagement part 74 to position the movable member 42 in the first actuated position P22. The second movable part 50 includes the first engagement part 74 protrudes from the second movable body 60. The lock member 72 includes a lock body 78. The second engagement part 76 protrudes from the lock body 78.

The lock member 72 is movably coupled to the base member 40 between a lock position P31 where the second engagement part 76 is engaged with the first engagement part 74 and a release position P32 where the second engagement part 76 is disengaged from the first engagement part 74. The lock member 72 is pivotally provided in the second guide recess 58. The lock body 78 includes a first curved surface 78A. The base member 40 includes a lock support 79 provided in the second guide recess 58. The lock support 79 includes a second curved surface 79A slidable with the first curved surface 78A.

The lock member 72 is pivotable relative to the base member 40 about a pivot axis A1 between the lock position P31 and the release position P32. The second engagement part 76 is engaged with the first engagement part 74 of the movable member 42 to position the movable member 42 in the first actuated position P22 in a state where the second engagement part 76 is in the lock position P31. The second engagement part 76 is disengaged from the first engagement part 74 of the movable member 42 in a state where the second engagement part 76 is in the release position P32.

The positioning structure 70 includes a lock biasing member 80. The lock biasing member 80 is provided between the lock support 79 and the lock member 72 to bias the lock member 72 toward the lock position P31.

Figure 10:
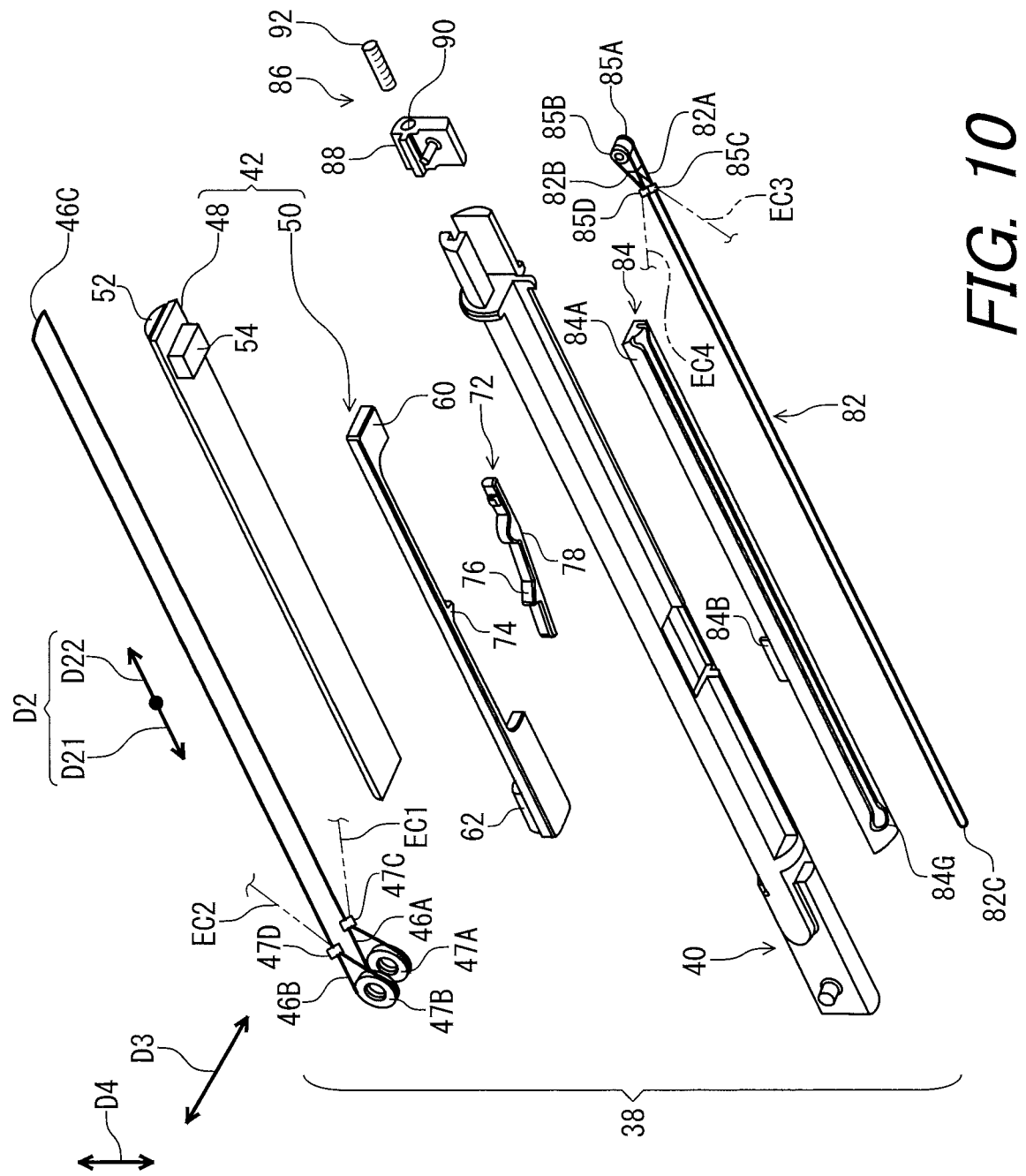
FIG. 10 is another exploded perspective view of the actuation device of the telescopic apparatus illustrated in FIG. 2.

As seen in FIG. 10, the actuator 44 includes an additional actuation wire 82 configured to vary a total length of the additional actuation wire 82 to move the movable member 42 in the second direction D22 opposite to the first direction D21. The additional actuation wire 82 is configured to disengage the second engagement part 76 from the first engagement part 74. The additional actuation wire 82 is configured to move the lock member 72 from the lock position P31 (FIG. 9) to the release position P32 (FIG. 9) relative to the base member 40.

As seen in FIG. 9, the positioning structure 70 includes a release member 84. The release member 84 is movable relative to the movable member 42 (and the base member 40) between a second initial position P41 where the lock member 72 is positioned in the lock position P31 and a second actuated position P42 where the release member 84 is engaged with the lock member 72 to position the lock member 72 in the release position P32.

As seen in FIG. 8, the release member 84 includes a release body 84A and a release protrusion 84B. The release body 84A extends in the actuation direction D2. The release protrusion 84B protrudes from the release body 84A. As seen in FIG. 9, the release protrusion 84B includes a guide surface 84C contactable with the lock member 72. The guide surface 84C is inclined relative to the actuation direction D2.

As seen in FIG. 10, the additional actuation wire 82 is configured to pull the release member 84 from the second initial position P41 (FIG. 9) to the second actuated position P42 (FIG. 9) in the second direction D22. The additional actuation wire 82 is configured to decrease the total length of the additional actuation wire 82 to pull the release member 84 in accordance with an increase in the stimulation. The additional actuation wire 82 is configured to increase the total length of the additional actuation wire 82 to release a pulling force F2 of the additional actuation wire 82 in accordance with a decrease in the stimulation.

The additional actuation wire 82 includes a first additional wire end portion 82A, a second additional wire end portion 82B, and an additional intermediate portion 82C. The first additional wire end portion 82A is coupled to the base member 40. The second additional wire end portion 82B is opposite to the first additional wire end portion 82A. The second additional wire end portion 82B is coupled to the base member 40. The additional intermediate portion 82C is provided between the first additional wire end portion 82A and the second additional wire end portion 82B. The additional intermediate portion 82C is coupled to the release member 84.

The first additional wire end portion 82A is spaced apart from the second additional wire end portion 82B in the first perpendicular direction D3. The additional intermediate portion 82C extends from the first additional wire end portion 82A and the second additional wire end portion 82B in the actuation direction D2. The actuation device 38 comprises a first additional wire coupling member 85A and a second additional wire coupling member 85B. The first additional wire coupling member 85A and the second additional wire coupling member 85B are rotatably attached to the base member 40. The first additional wire end portion 82A is wound around the first additional wire coupling member 85A and is secured to an electric cable EC3 with a crimp terminal 85C. The second additional wire end portion 82B is wound around the second additional wire coupling member 85B and is secured to an electric cable EC4 with a crimp terminal 85D. The release member 84 includes a groove 84G. The additional actuation wire 82 is provided in the groove 84G.

The actuation device 38 further comprises an additional adjustment structure 86 configured to adjust a tension of the additional actuation wire 82. The additional adjustment structure 86 includes an adjustment portion 88, a threaded hole 90, and an adjustment member 92. The adjustment portion 88 is provided on the base member 40. The adjustment portion 88 is coupled to the additional actuation wire 82. The threaded hole 90 is provided on the adjustment portion 88. The adjustment member 92 is threaded into the threaded hole 90 so as to change relative position between the adjustment portion 88 and the base member 40. The first additional wire coupling member 85A and the second additional wire coupling member 85B are rotatably attached to the adjustment portion 88. The adjustment portion 88 is movably attached to the base member 40 in the actuation direction D2.

Figure 11:
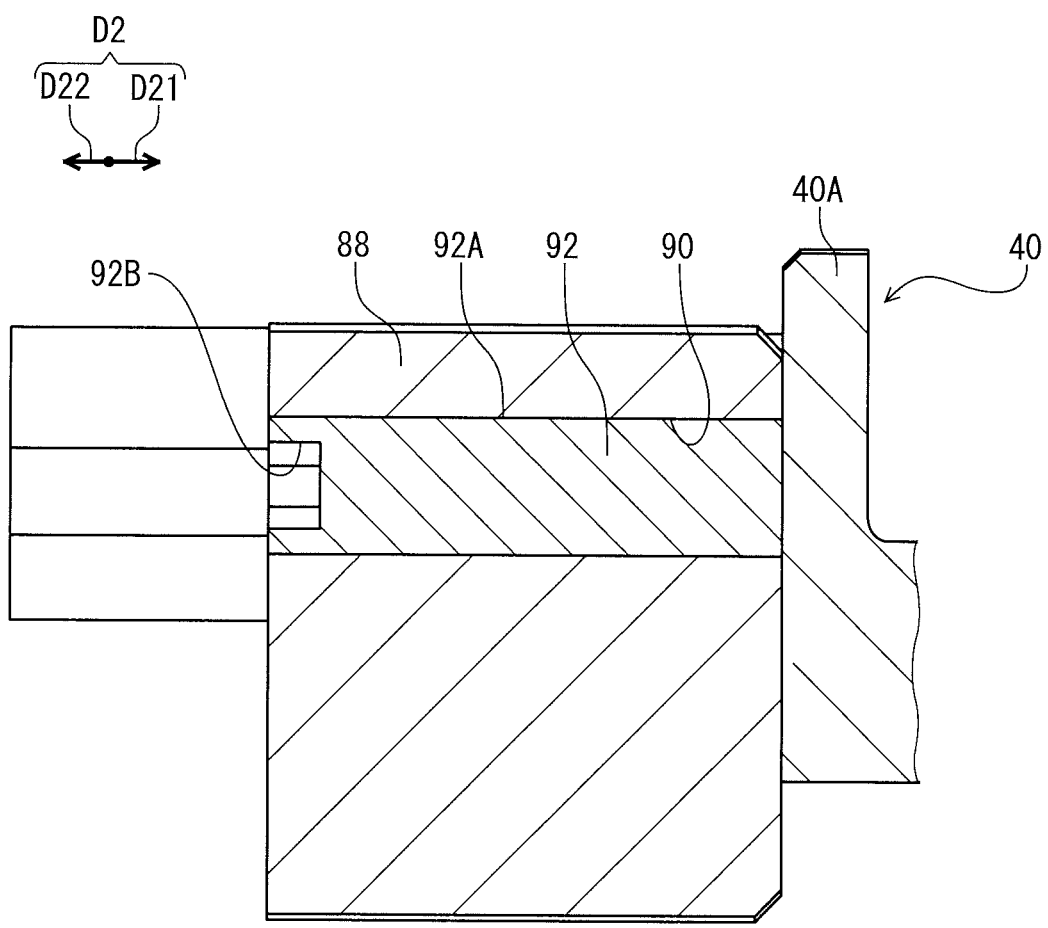
FIG. 11 is a partial cross-sectional view of the actuation device of the telescopic apparatus illustrated in FIG. 2.

As seen in FIG. 11, the adjustment member 92 includes an external thread 92A. The external thread 92A of the adjustment member 92 is engaged in the threaded hole 90. The adjustment member 92 is in contact with the base member 40. The adjustment member 92 includes a tool engagement hole 92B configured to be engaged with a tool. Rotation of the adjustment member 92 changes the position of the adjustment portion 88 relative to the base member 40 in the actuation direction D2.

Figure 12:
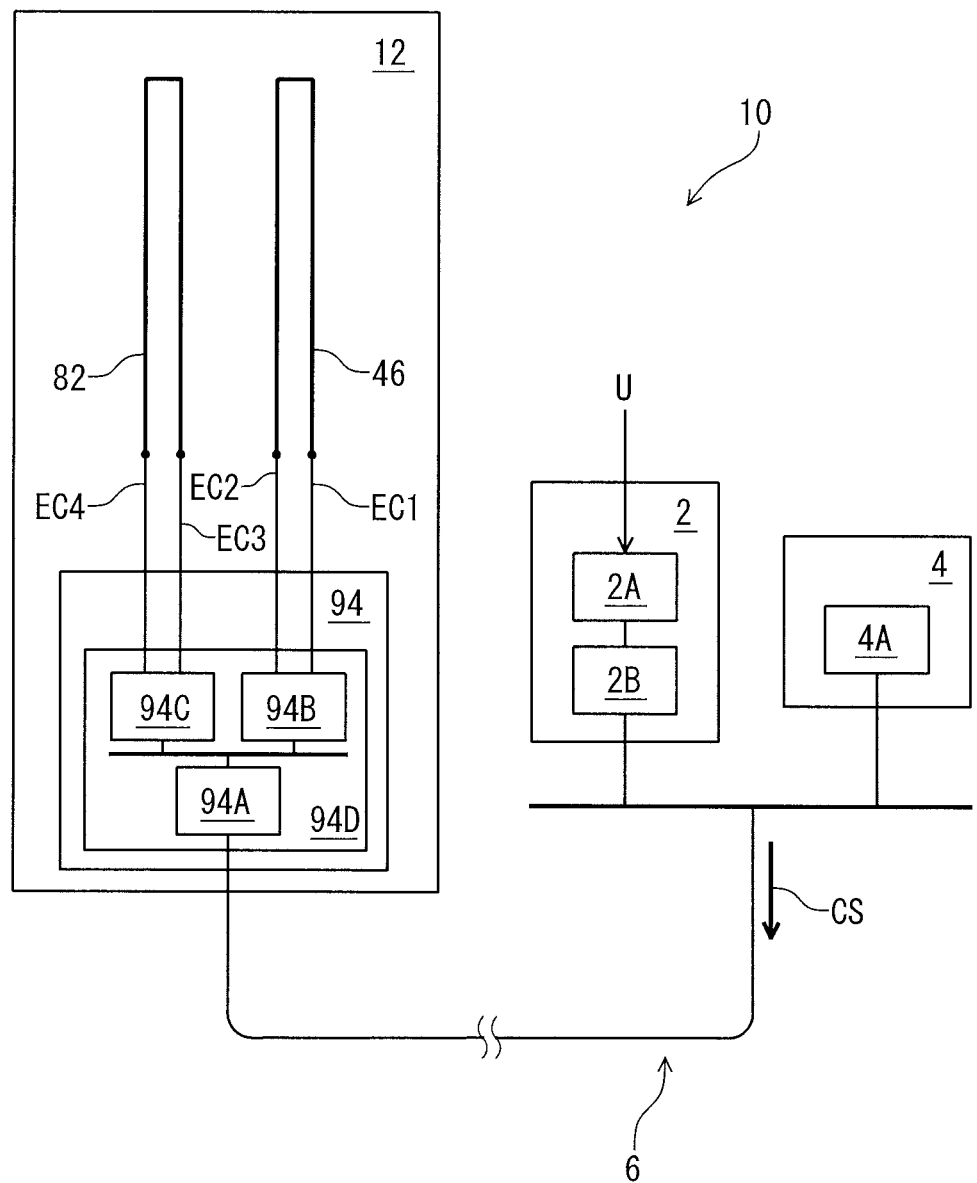
FIG. 12 is a schematic block diagram of the telescopic actuation system illustrated in FIG. 1.

As seen in FIG. 12, the telescopic actuation system 10 includes an operating device 2 and an electric power source 4. The operating device 2 includes an electrical switch 2A configured to receive a user input U to generate a control signal CS. In this embodiment, the electrical switch 2A is be configured to generate the control signal CS having a signal length corresponding to a time for which the user keeps pushing the electrical switch 2A. However, the electrical switch 2A can be configured to generate the control signal CS having a constant length regardless of a time for which the user keeps pushing the electrical switch 2A.

For example, the operating device 2 is provided at a position (e.g., a handlebar) where the rider can access the operating device 2. The electric power source 4 is mounted on a bicycle frame (not shown). For example, the electric power source 4 includes a battery 4A. However, the electric power source 4 can include other components instead of or in addition to the battery 4A.

The telescopic apparatus 12 comprises an actuation controller 94 electrically connected to the actuation device 38 (e.g., the actuation wire 46 and the additional actuation wire 82), the operating device 2, and the electric power source 4 to control the stimulation of the actuation device 38 in response to the control signal CS. The actuation controller 94 is electrically connected to the actuation wire 46 with the electric cables EC1 and EC2. The actuation controller 94 is electrically connected to the additional actuation wire 82 with the electric cables EC3 and EC4. The actuation controller 94 is configured to control voltage and/or current (physical amount relating to the electric charge) applied from the electric power source 4 to the actuation wire 46 in response to receipt of the control signal CS. The actuation controller 94 is configured to control voltage and/or current (physical amount relating to the electric charge) applied from the electric power source 4 to the additional actuation wire 82 in response to termination of the control signal CS.

In this embodiment, the actuation controller 94 is electrically connected to the operating device 2 and the electric power source 4 with an electric communication path 6. The electric communication path 6 includes a ground line and a voltage line. Electricity is supplied from the electric power source 4 to the operating device 2 and the actuation controller 94 via the voltage line of the electric communication path 6. In this embodiment, the actuation controller 94, the operating device 2, and the electric power source 4 are configured to communicate with each other through the voltage line using the power line communication technology.

The power line communication (PLC) uses unique identifying information such as a unique identifier that is assigned to each of the operating device 2 and the actuation controller 94. Each of the operating device 2 and the actuation controller 94 includes a PLC controller in which the unique identifying information is stored. Based on the unique identifying information, each of the operating device 2 and the actuation controller 94 can recognize control signals which are necessary for itself among control signals transmitted via the electric communication path 6. For example, the actuation controller 94 can recognize the control signal transmitted from the operating device 2 via the electric communication path 6. Instead of using the PLC technology, however, separate signal wires can be provided for transmitting data in addition to the ground wire and the voltage wire if needed and/or desired. Furthermore, wireless technology can be used to transmit the control signal CS between the operating device 2 and the actuation controller 94.

The operating device 2 includes a PLC controller 2B connected to the electrical switch 2A. The actuation controller 94 includes a PLC controller 94A electrically connected to the PLC controller 2B of the operating device 2 with the electric communication path 6. The PLC controller 2B is configured to superimpose the control signal CS on a power source voltage applied to the actuation controller 94 from the electric power source 4. The PLC controller 94A is configured to separate input signals to the power source voltage and the control signal CS. The PLC controller 94A is configured to regulate the power source voltage to a level at which the PLC controller 94A can properly operate.

The actuation controller 94 controls the stimulation (e.g., an amount of electric charge) at an initial level (e.g., zero) while the actuation controller 94 does not receive the control signal CS from the operating device 2. The actuation controller 94 increases the stimulation (e.g., the amount of electric charge) of the actuation wire 46 from the initial level to a predetermined actuation level which is higher than the initial level for an actuation time when the actuation controller 94 receives the control signal CS from the operating device 2. The actuation controller 94 decreases the stimulation of the actuation wire 46 from the predetermined actuation level to the initial level after the actuation time elapses.

Furthermore, the actuation controller 94 increases the stimulation (e.g., the amount of electric charge) of the additional actuation wire 82 from the initial level to a predetermined actuation level which is higher than the initial level for an additional actuation time when the actuation controller 94 detects termination of the control signal CS from the operating device 2. The actuation controller 94 decreases the stimulation of the additional actuation wire 82 from the predetermined actuation level to the initial level after the additional actuation time elapses.

In this embodiment, the actuation controller 94 includes a boost converter 94B, an additional boost converter 94C, and a circuit board 94D. The PLC controller 94A, the boost converter 94B, and the additional boost converter 94C are electrically mounted on the circuit board 94D. The PLC controller 94A is electrically connected to the boost converter 94B and the additional boost converter 94C with an electrical conductor of the circuit board 94D. The circuit board 94D is secured to the first support 22.

As seen in FIG. 12, the boost converter 94B is configured to increase the voltage applied from the electric power source 4 to the actuation wire 46 to the predetermined actuation level for the actuation time in response to the receipt of the control signal CS. The boost converter 94B decreases the voltage applied to the actuation wire 46 from the predetermined actuation level to the initial level after the actuation time elapses. Furthermore, the additional boost converter 94C is configured to increase the voltage applied from the electric power source 4 to the actuation wire 46 to the predetermined actuation level for the additional actuation time in response to the termination of the control signal CS. The additional boost converter 94C decreases the voltage applied to the additional actuation wire 82 from the predetermined actuation level to the initial level after the additional actuation time elapses. For example, each of the boost converter 94B and the additional boost converter 94C is a DC-DC boost converter.

When the actuation controller 94 receives the control signal CS from the operating device 2, the actuation wire 46 decreases in length for the actuation time in response to the increase in the stimulation (e.g., electric charge) to move the movable member 42 from the first initial position P21 toward the first actuated position P22 in the first direction D21. Thus, the actuation wire 46 moves the valve rod 20 from the closed position P1 toward the open position P2 in the first direction D21 when the actuation controller 94 receives the control signal CS from the operating device 2. The actuation wire 46 increases in length in response to the decrease in stimulation (e.g., electric charge) when the actuation time elapses from the receipt of the control signal CS. However, the positioning structure 70 maintains the position of the movable member 42 in the first actuated position P22 even when the increase in the stimulation is terminated after the actuation wire 46 increases in length. This changes the state of the hydraulic structure 18 from the closed state to the open state, allowing the user to adjust the height of the saddle using the user's weight while the rider operates the operating device 2.

When the actuation controller 94 detects the termination of the control signal CS from the operating device 2, the additional actuation wire 82 decreases in length for the additional actuation time in response to the increase in the stimulation (e.g., electric charge) to move the release member 84 from the second initial position P41 toward the second actuated position P42 in the second direction D22. Thus, the release member 84 releases the engagement between the lock member and the movable member. The movable member returns from the first actuated position P22 to the first initial position P21, and therefore the valve rod 20 returns from the open position P2 to the closed position P1. This changes the state of the hydraulic structure 18 from the open state to the closed state, positioning the second tube 16 relative to the first tube 14 in a position of when the hydraulic structure 18 changes to the closed state. The additional actuation wire 82 increases in length in response to the decrease in stimulation (e.g., electric charge) when the additional actuation time elapses from the termination of the control signal CS. Thus, the release member 84 returns to the second initial position P41 after the additional actuation time elapsed.

Second Embodiment

A telescopic apparatus 212 in accordance with a second embodiment will be described below referring to FIGS. 13 to 27. The telescopic apparatus 212 has the same structure and/or configuration as those of the telescopic apparatus 12 except for the positioning structure 70. Thus, elements having substantially the same function as those in the first embodiment will be numbered the same here and will not be described and/or illustrated again in detail here for the sake of brevity.

Figure 13:
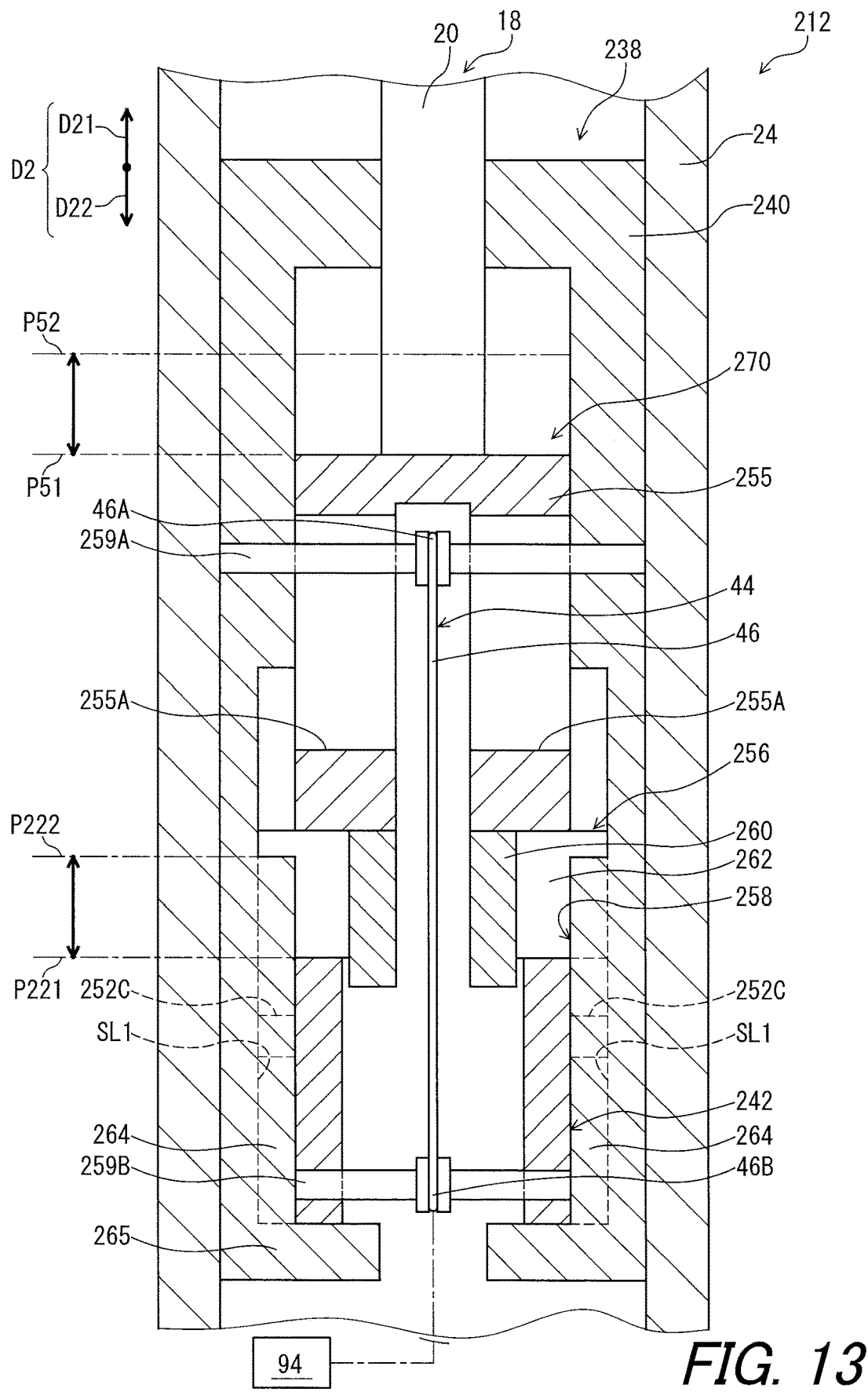
FIG. 13 is a partial cross-sectional view of an actuation device of a telescopic apparatus in accordance with a second embodiment (first initial position).

As seen in FIG. 13, telescopic apparatus 212 comprises an actuation device 238. The actuation device 238 for the human-powered vehicle HV comprises a base member 240 and a movable member 242. The movable member 242 is movably provided on the base member 240. The movable member 242 is movable relative to the base member between a first initial position P221 and a first actuated position P222. The actuation device 238 comprises the actuator 44 configured to be actuated by stimulation including at least one of electric stimulation and heat stimulation so as to move the movable member 242 relative to the base member 240 in the first direction D21 by pulling the movable member 242. The actuator 44 includes the actuation wire 46 configured to vary the total length of the actuation wire 46 to pull the movable member 242 in accordance with a change in the stimulation. However, the additional actuation wire 82 is omitted from the actuator 44.

In this embodiment, the actuation device 238 includes a first wire support 259A and a second wire support 259B. The first wire support 259A is secured to the base member 240. The second wire support 259B is secured to the movable member 242. The first wire end portion 46A of the actuation wire 46 is coupled to the first wire support 259A. The second wire end portion 46B is coupled to the second wire support 259B.

The actuation device 238 further comprises a positioning structure 270 configured to maintain a position of the movable member 242. The positioning structure 270 is configured to position the movable member 242 relative to the base member 240 in the first actuated position P222 after the actuation wire 46 pulls the movable member 242 from a first initial position P221 to the first actuated position P222. The actuation device 238 has substantially the same structure as that of the actuation device 38 of the first embodiment. The base member 240 has substantially the same structure as that of the base member 40 of the first embodiment. The movable member 242 has substantially the same structure as that of the movable member 42 of the first embodiment. The positioning structure 270 has substantially the same structure as that of the positioning structure 70 of the first embodiment.

The positioning structure 270 is configured to position the movable member 242 relative to the base member 240 in the first actuated position P222 after the actuation wire 46 pulls the movable member 242 from the first initial position P221 to the first actuated position P222. In this embodiment, the positioning structure 270 is configured to switch a position of the output member 255 between a first position P51 and a second position P52 in response to axial movement of the movable member 242.

As seen in FIG. 13, the positioning structure 270 includes an output member 255, a rotatable member 256, and a cam member 258. The rotatable member 256 is provided between the output member 255 and the movable member 242 in the actuation direction D2. The rotatable member 256 is rotatable relative to the output member 255, the base member 240, and the movable member 242. The output member 255 includes a pair of guide grooves 255A. The first wire support 259A extends through the guide grooves 255A to restrict the output member 255 from rotating relative to the base member 240. The output member 255 is in contact with the valve rod 20 of the hydraulic structure 18. The output member 255 is slidable with the rotatable member 256.

The cam member 258 is configured to position the output member 255 via the rotatable member 256 at each of the first position P51 and the second position P52. The cam member 258 is provided on the inner peripheral surface of the base member 240.

Figure 15:
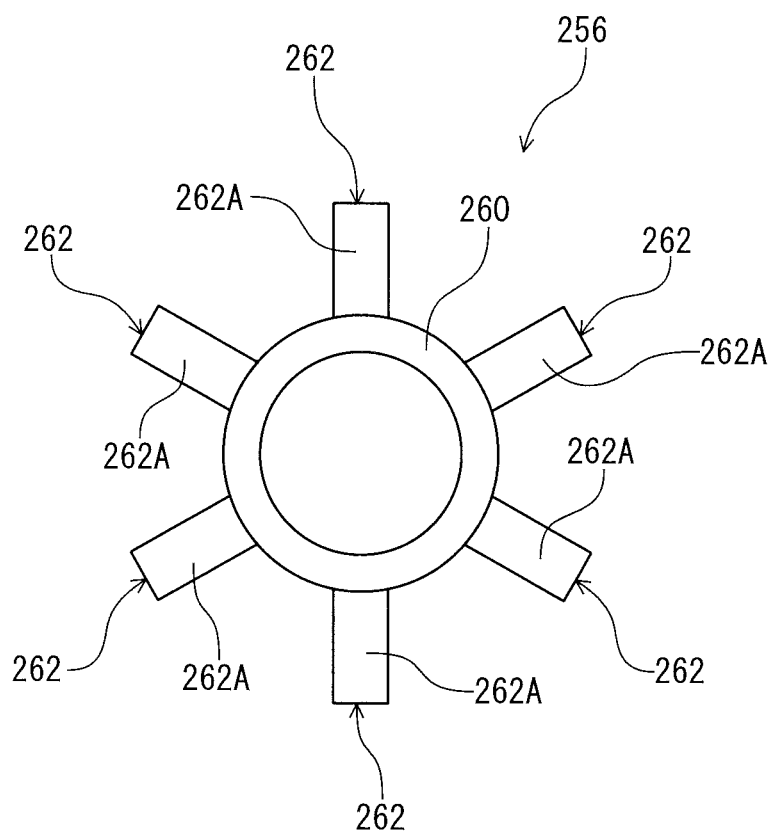
FIG. 15 is a bottom view of a rotatable member provided in the actuation device illustrated in FIG. 13.
Figure 16:
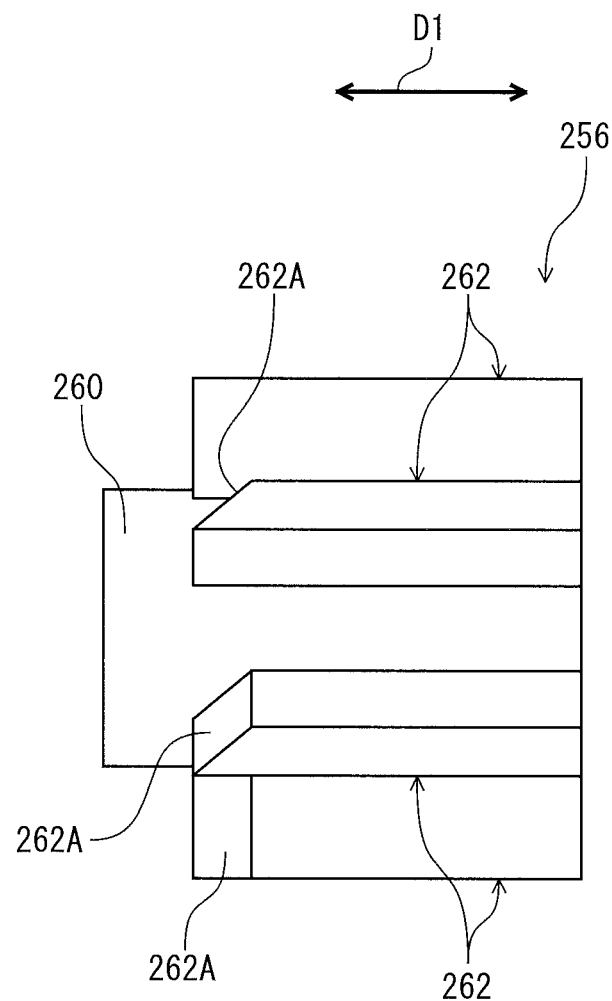
FIG. 16 is a side elevational view of the rotatable member illustrated in FIG. 15.
Figure 17:
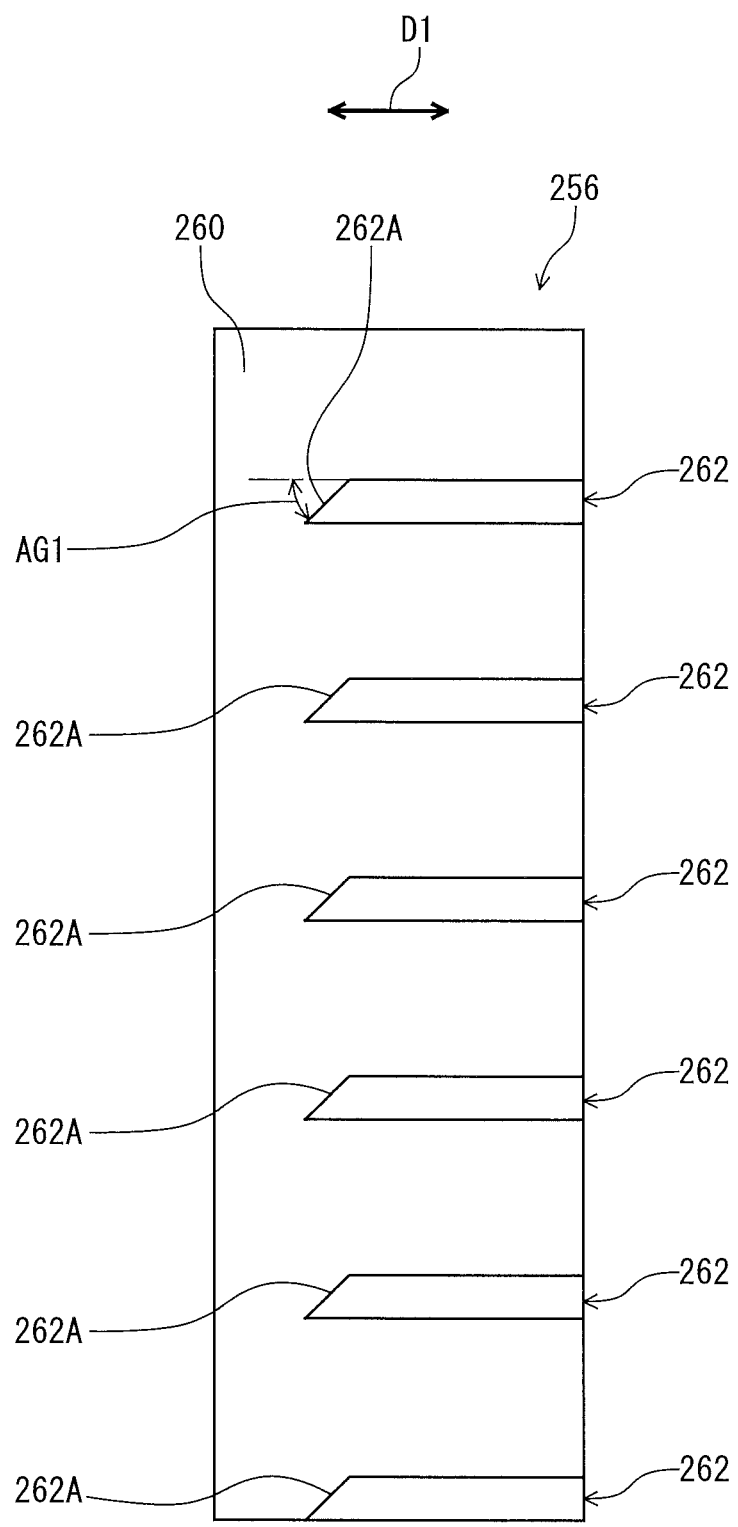
FIG. 17 is a development view of the rotatable member illustrated in FIG. 15 when viewed from a radially outer side of the rotatable member.

As seen in FIGS. 15 to 17, the rotatable member 256 includes a tubular part 260 and a plurality of cam followers 262. The plurality of cam followers 262 is provided on an outer peripheral surface of the tubular part 260 and protrudes radially outward from the tubular part 260. The plurality of cam followers 262 has the same shape as each other and are circumferentially arranged.

Each of the cam followers 262 has a sliding surface 262A. As seen in FIG. 17, the sliding surface 262A is inclined relative to the actuation direction D2 at an inclination angle AG1 and is substantially parallel to a radial direction of the rotatable member 256 (a direction perpendicular to a paper surface of FIG. 17).

Figure 18:
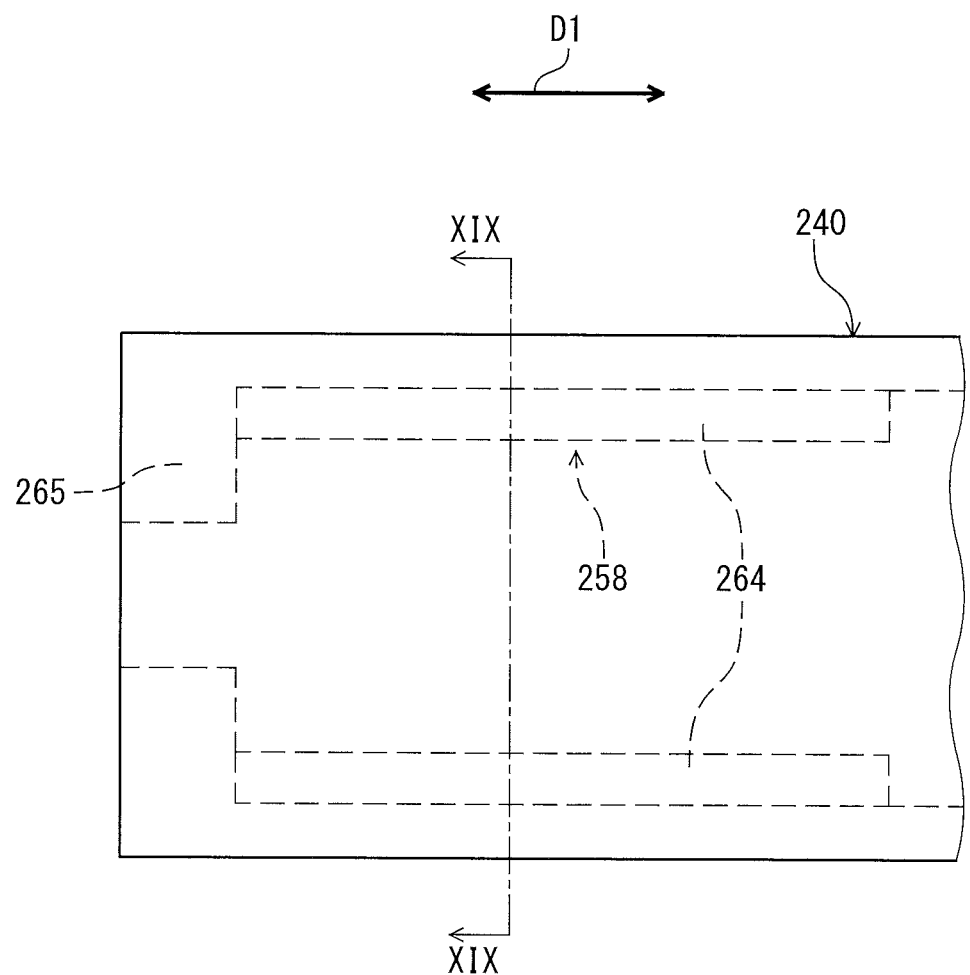
FIG. 18 is a side elevational view of a cam member and a base member provided in the actuation device illustrated in FIG. 15.
Figure 19:
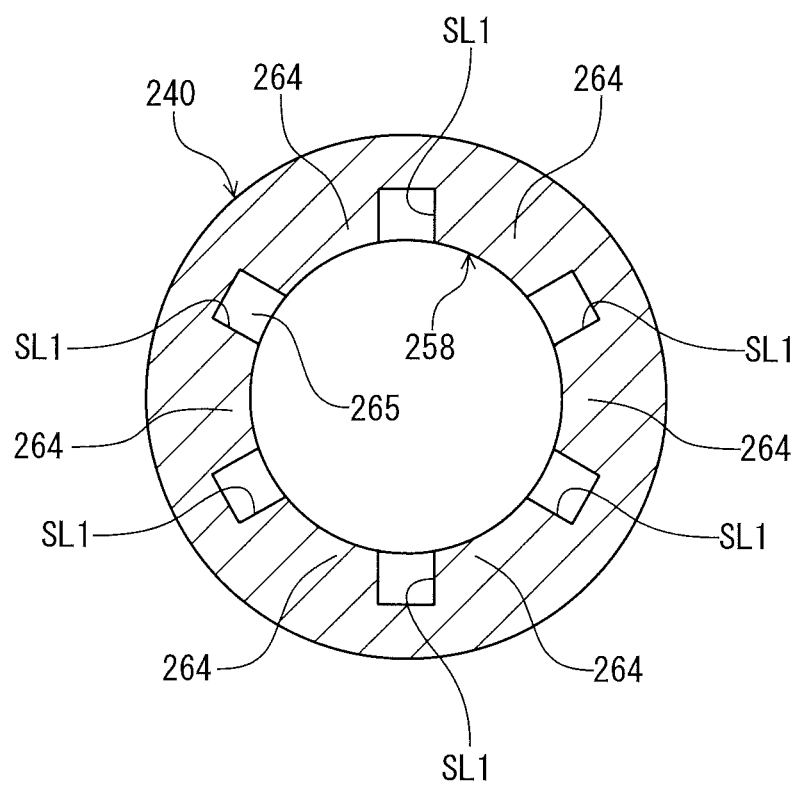
FIG. 19 is a cross-sectional view of the cam member taken along line XIX-XIX of FIG. 18.
Figure 20:
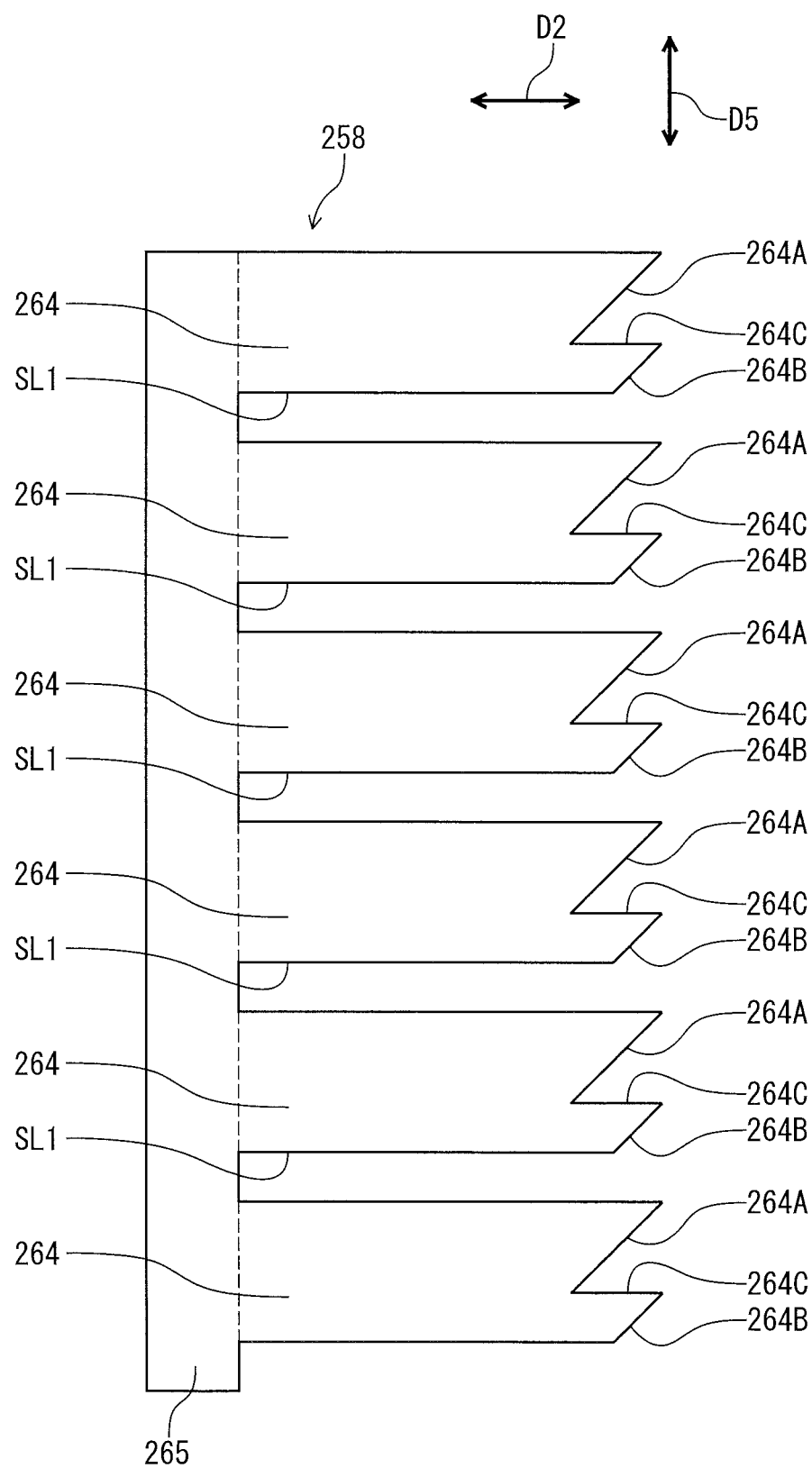
FIG. 20 is a development view of the cam member illustrated in FIG. 18 when viewed from a radially outer side of the cam member.

As seen in FIGS. 18 to 20, the cam member 258 includes a plurality of cam portions 264 and an annular end portion 265. The plurality of cam portions 264 are provided on the inner peripheral surface of the base member 240. As seen in FIG. 19, the cam portions 264 are circumferentially arranged and are spaced apart from each other to define slits SL1 therebetween. The plurality of cam portions 264 protrudes radially inward from the inner peripheral surface of the base member 240. As seen in FIGS. 18 and 20, the plurality of cam portions 264 extend in the actuation direction D2 from the annular end portion 265. The movable member 242 is contactable with the annular end portion 265.

As seen in FIG. 20, each of the cam portions 264 includes a first cam surface 264A and a second cam surface 264B. The first cam surface 264A is inclined relative to the actuation direction D2 and is substantially parallel to a radial direction of the rotatable member 256 (a direction perpendicular to a paper surface of FIG. 20). The second cam surface 264B is inclined relative to the actuation direction D2 and is substantially parallel to the radial direction of the rotatable member 256 (the direction perpendicular to a paper surface of FIG. 20). In this embodiment, each of the first cam surface 264A and the second cam surface 264B is inclined relative to the actuation direction D2 at an angle substantially equal to the inclination angle AG1 of the sliding surface 262A (FIG. 17). Each of the first cam surface 264A and the second cam surface 264B is configured to circumferentially guide the cam follower 262 (FIGS. 15 to 17).

As seen in FIG. 20, each of the cam portions 264 includes a stopper surface 264C provided between the first cam surface 264A and the second cam surface 264B. The stopper surface 264C is substantially parallel to the actuation direction D2 and the radial direction of the rotatable member 256 (the direction perpendicular to a paper surface of FIG. 20). The first cam surface 264A and the stopper surface 264C are configured to position the cam follower 262 in the actuation direction D2 and a circumferential direction D5 of the output member 255 so that the output member 255 is positioned at the first position P51 (FIG. 13).

As seen in FIG. 13, the movable member 242 is provided radially inward of the cam member 258 and is movable relative to the cam member 258 in the actuation direction D2. As seen in FIGS. 21 to 24, the movable member 242 includes a movable body 252A and a plurality of protrusions 252C. The movable body 252A has a tubular shape. The protrusions 252C protrude radially outward from the movable body 252A.

Figure 21:
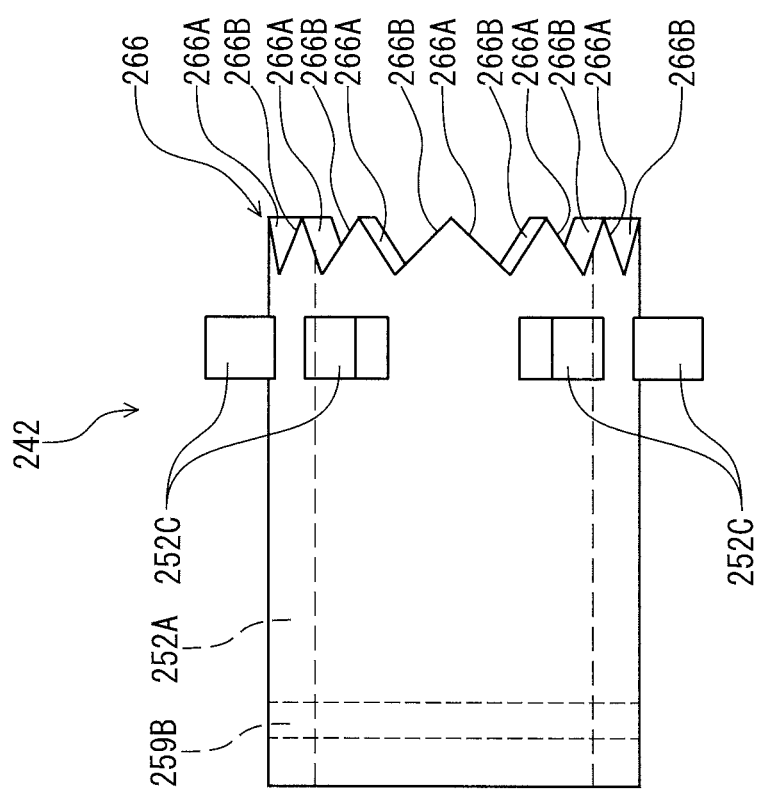
FIG. 21 is a side elevational view of an movable member provided in the actuation device illustrated in FIG. 15.
Figure 22:
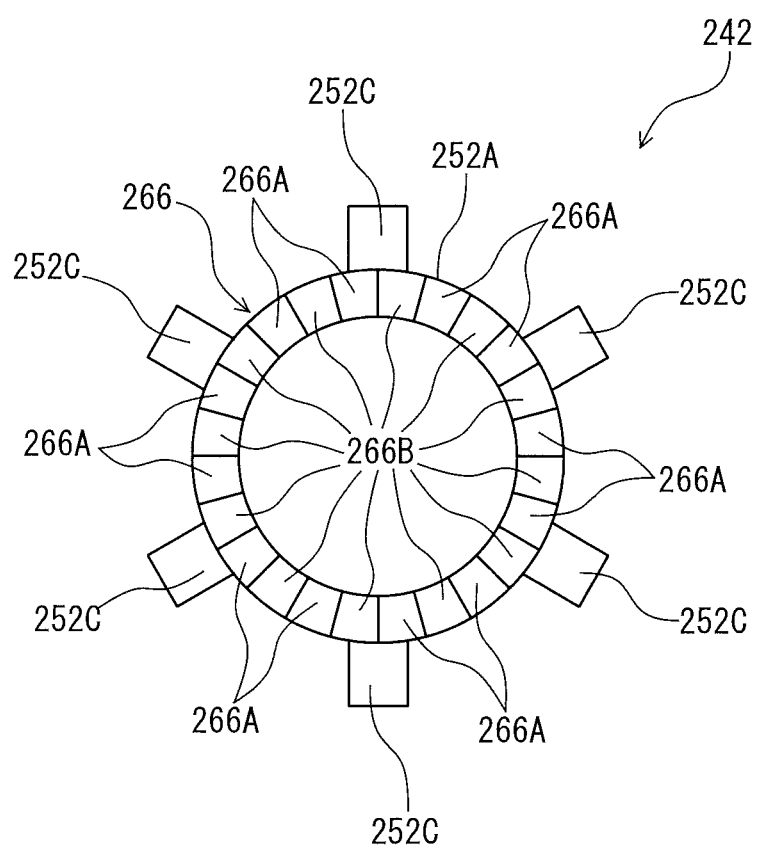
FIG. 22 is a bottom view of the movable member illustrated in FIG. 21.
Figure 23:
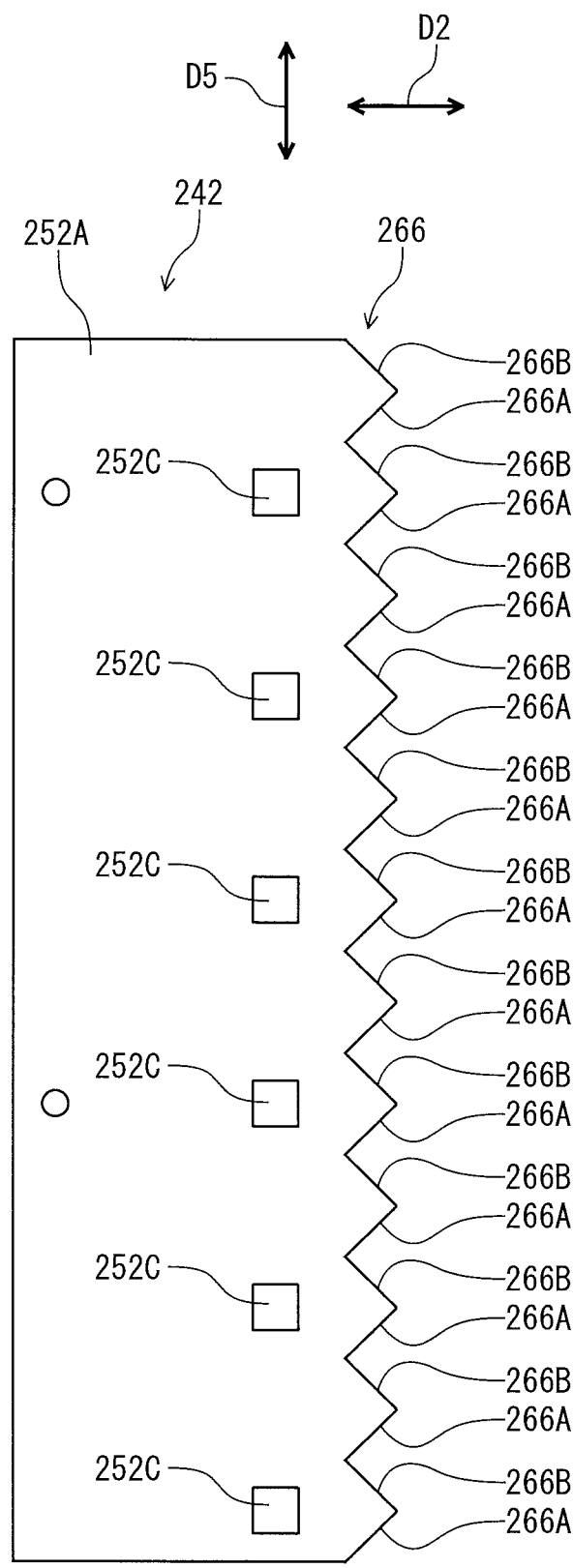
FIG. 23 is a development view of the movable member illustrated in FIG. 21 when viewed from a radially outer side of the movable member.

As seen in FIGS. 21 to 23, the movable member 242 includes a guiding part 266 configured to guide the rotatable member 256 in the actuation direction D2 and the circumferential direction D5. The guiding part 266 includes a plurality of first guiding surfaces 266A and a plurality of second guiding surfaces 266B. The plurality of first guiding surfaces 266A and the plurality of second guiding surfaces 266B are alternatively arranged in the circumferential direction D5.

As see in FIG. 23, each of the plurality of first guiding surfaces 266A is inclined relative to the actuation direction D2 and is substantially parallel to the radial direction of the movable member 242 (a direction perpendicular to a paper surface of FIG. 23). Each of the plurality of second guiding surfaces 266B is inclined relative to the actuation direction D2 and is substantially parallel to the radial direction of the movable member 242. In this embodiment, each of the plurality of first guiding surfaces 266A is inclined relative to the actuation direction D2 at an angle substantially equal to the inclination angle AG1 of the sliding surface 262A (FIG. 17).

Figure 14:
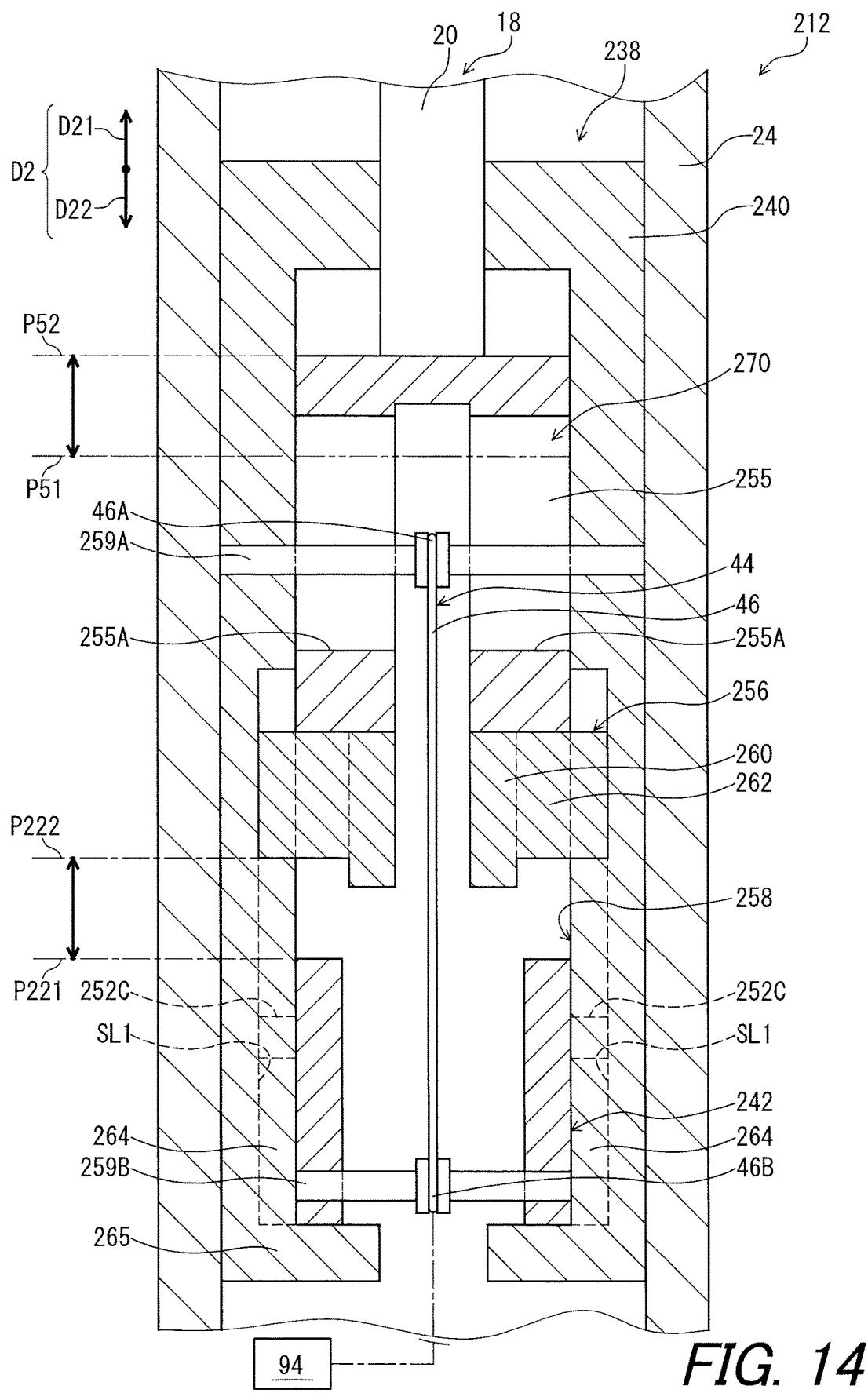
FIG. 14 is a partial cross-sectional view of the actuation device of the telescopic apparatus in accordance with a second embodiment (first actuated position).
Figure 24:
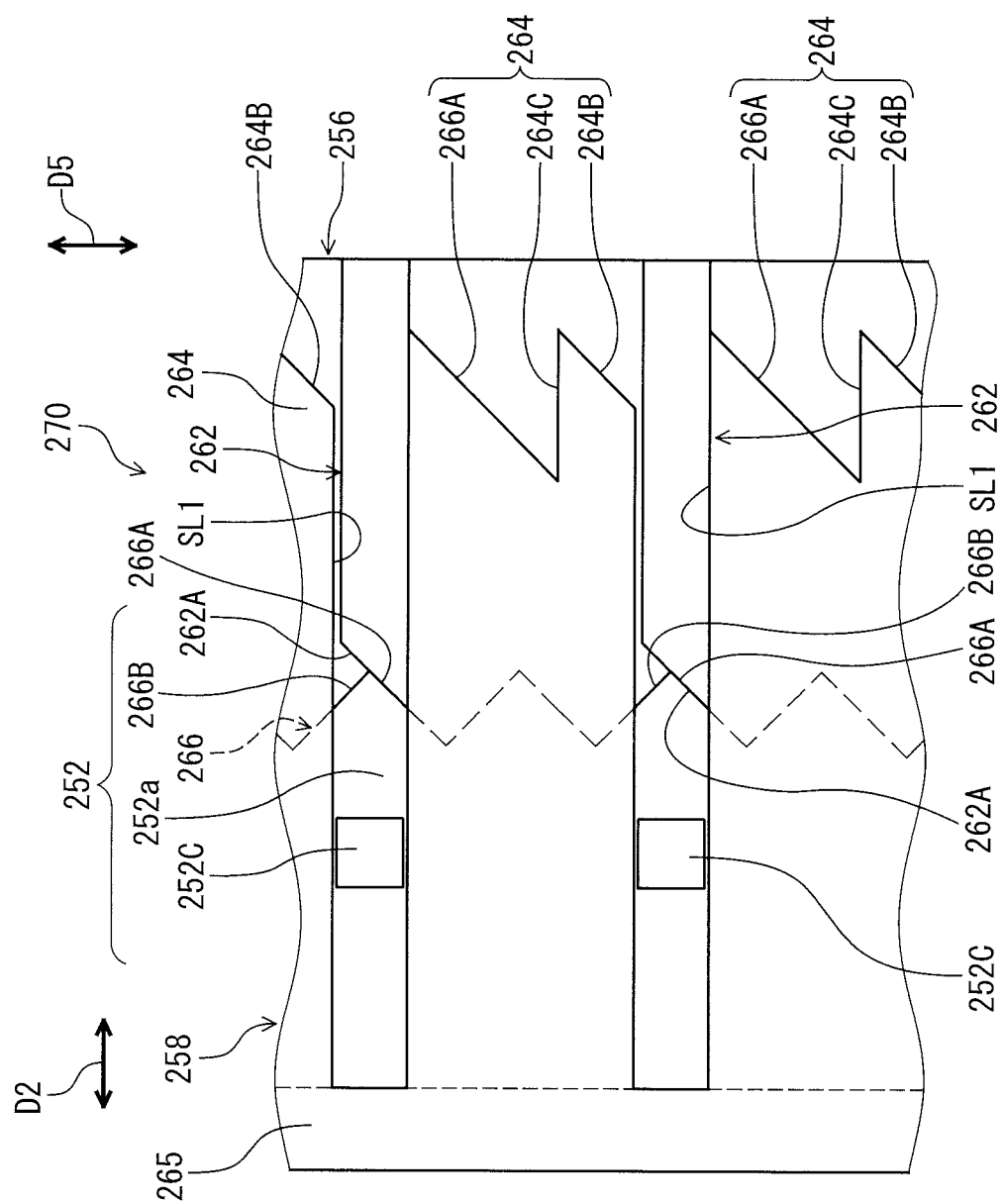
FIG. 24 is a development view of a positioning structure provided in the actuation device illustrated in FIG. 13 for explaining operation of the positioning structure.

The operation of the positioning structure 270 will be described in detail below referring to FIGS. 24 to 27. In FIG. 24, the positioning structure 270 positions the output member 255 at the first position P51 as shown in FIG. 13. In FIG. 26, the positioning structure 270 positions the output member 255 at the second position P52 as shown in FIG. 14.

As seen in FIG. 24, the cam follower 262 of the rotatable member 256 is provided in the slit SL1 of the cam member 258 in a state where the output member 255 is in the first position P51 (FIG. 13). In this state, the first guiding surface 266A of the movable member 242 contacts the sliding surface 262A of the cam follower 262 to position the cam follower 262 relative to the cam member 258 in the actuation direction D2. Adjacent two of the cam portions 264 position the cam follower 262 in the circumferential direction D5. The movable member 242 contacts the annular end portion 265 of the cam member 258 so that the movable member 242 and the rotatable member 256 are positioned relative to the cam member 258 in the actuation direction D2.

Figure 25:
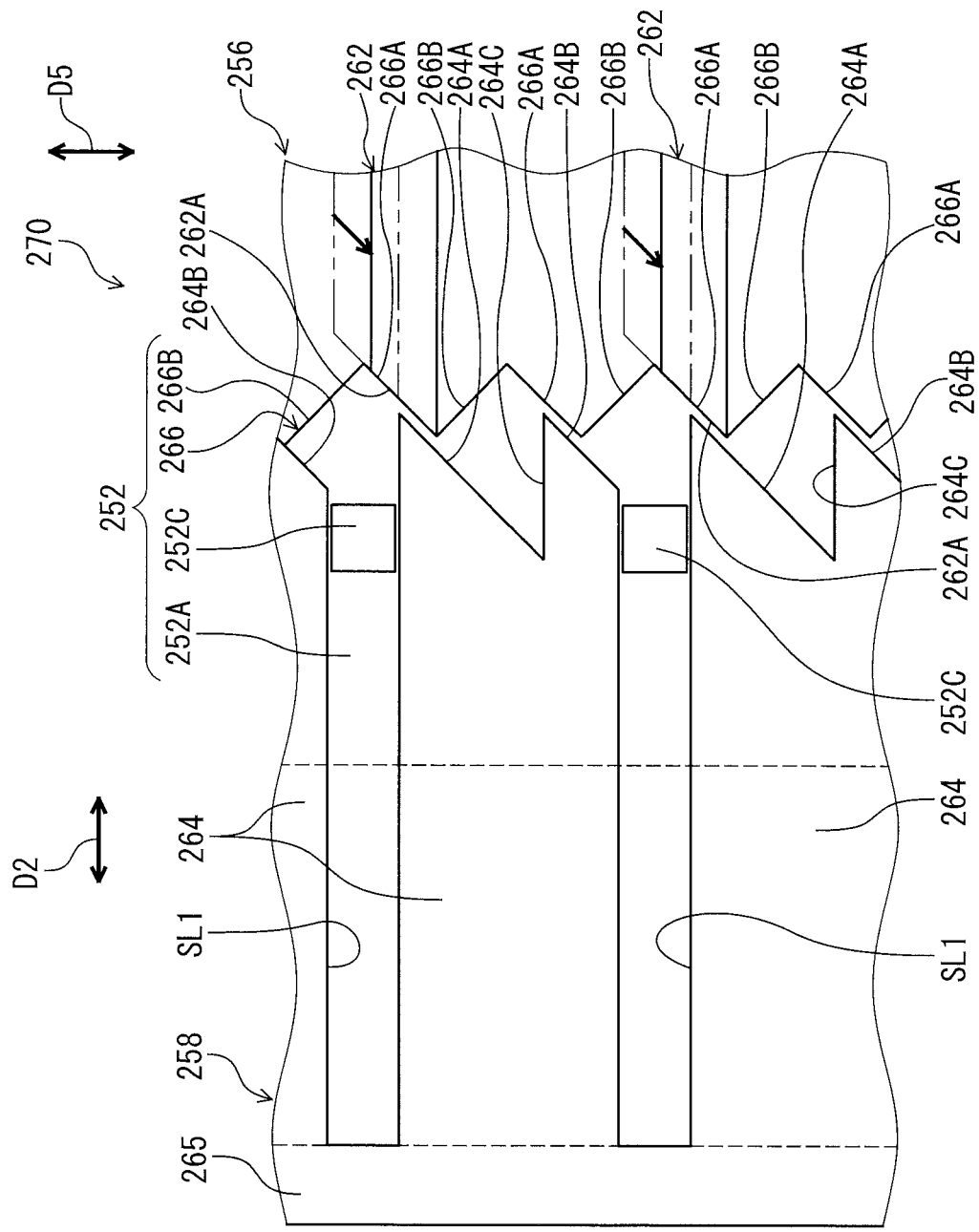
FIG. 25 is a development view of the positioning structure provided in the actuation device illustrated in FIG. 13 for explaining operation of the positioning structure.
Figure 26:
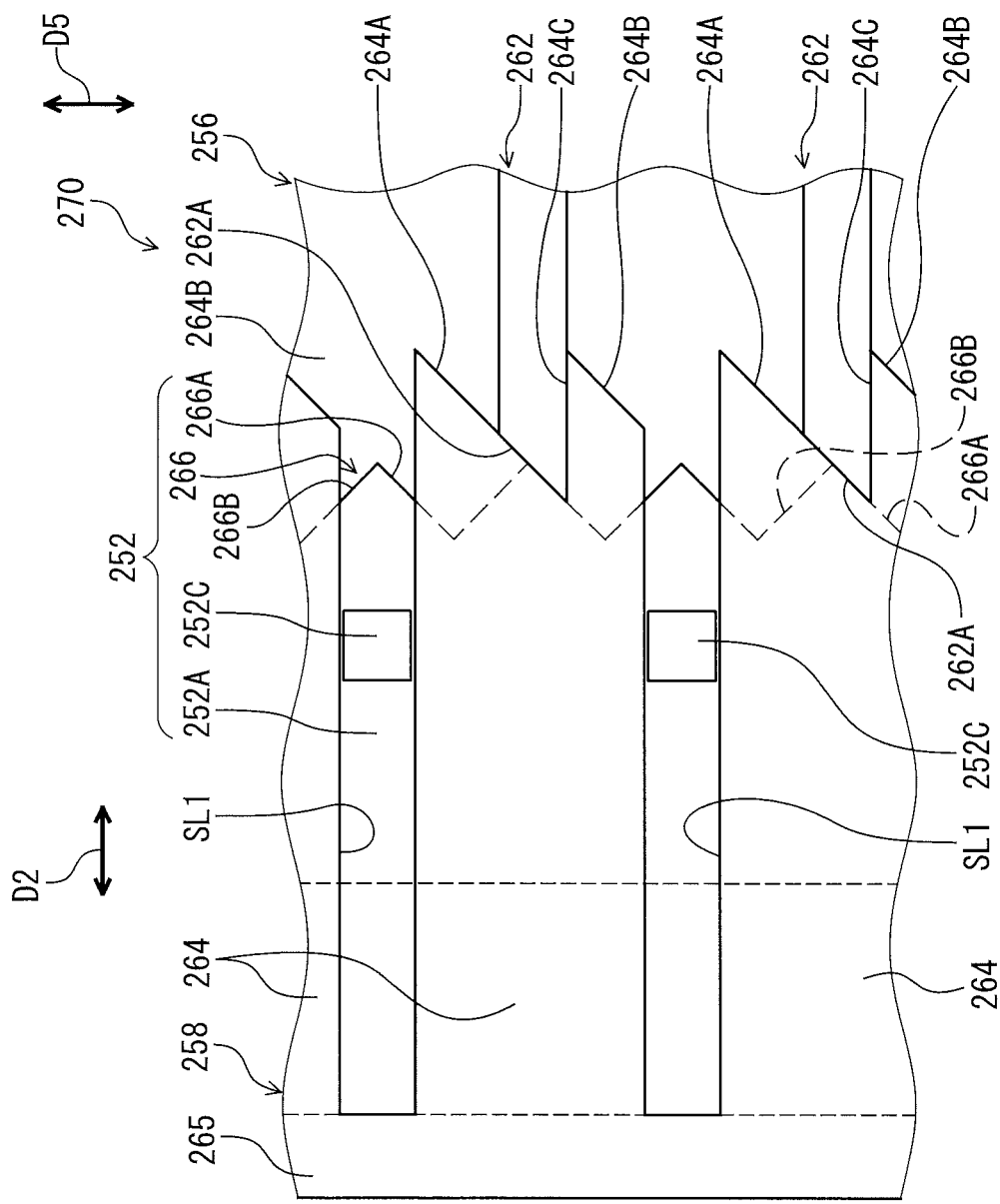
FIG. 26 is a development view of a positioning structure provided in the actuation device illustrated in FIG. 13 for explaining operation of the positioning structure.

As seen in FIG. 25, when the movable member 242 is pulled by the actuation wire 46 (FIG. 13) of the actuator 44 in the first direction D21, the rotatable member 256 is moved relative to the cam member 258 in the first direction D21. At this time, the sliding surface 262A of the cam follower 262 slides with the first guiding surface 266A so that the cam follower 262 is guided in the circumferential direction D5. The second guiding surface 266B contacts the cam follower 262 to position the cam follower 262 together with the first guiding surface 266A in the actuation direction D2 and the circumferential direction D5.

As seen in FIG. 26, when the pulling force is released from the actuation wire 46, the movable member 242 is moved relative to the cam member 258 in the second direction D22 by the biasing force of the biasing member 36 (FIG. 3). At this time, the sliding surface 262A of the cam follower 262 slides with the first cam surface 264A until the cam follower 262 contacts the stopper surface 264C. In the state where the cam followers 262 are pressed against the plurality of cam portions 264 by the biasing force of the biasing member 36, as seen in FIG. 14, the output member 255 is positioned at the second position P52 by the positioning structure 270.

Figure 27:
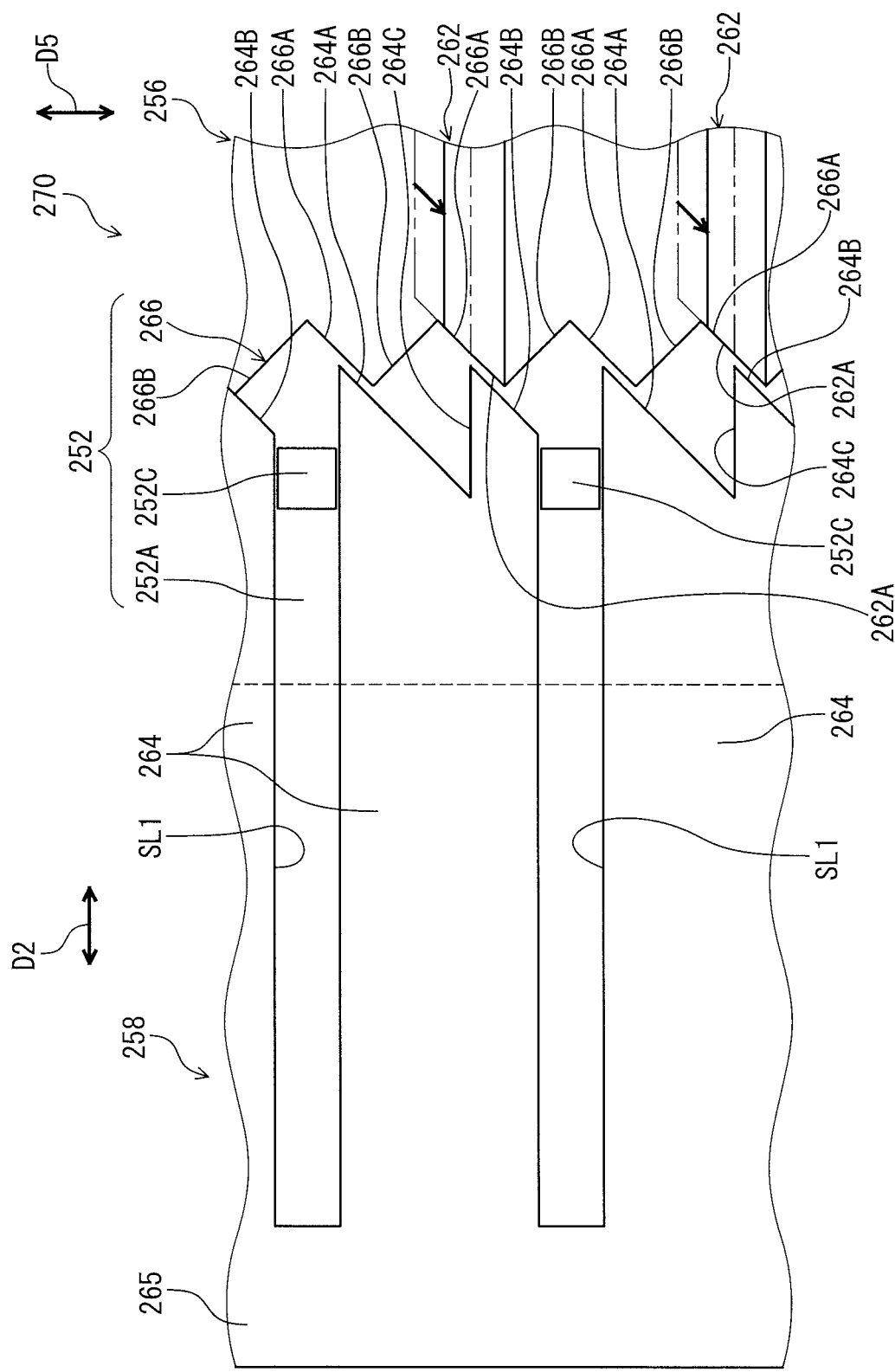
FIG. 27 is a development view of a positioning structure provided in the actuation device illustrated in FIG. 13 for explaining operation of the positioning structure.

As seen in FIG. 27, when the movable member 242 is pulled by the actuation wire 46 in the first direction D21, the rotatable member 256 is moved relative to the cam member 258 in the first direction D21. At this time, the sliding surface 262A of the cam follower 262 slides with the first guiding surface 266A of the movable member 242 so that the cam follower 262 is guided in the circumferential direction D5. The second guiding surface 266B of the movable member 242 contacts the cam follower 262 to hold the cam follower 262 together with the first guiding surface 266A in the actuation direction D2 and the circumferential direction D5.

As seen in FIG. 24, when the pulling force is released from the actuation wire 46, the movable member 242 is moved relative to the cam member 258 in the second direction D22 by the biasing force of the biasing member 36 (FIG. 3). At this time, the sliding surface 262A of the cam follower 262 slides with the second cam surface 264B, causing the cam follower 262 to be inserted into the slit SL1. In this state, the first guiding surface 266A of the movable member 242 contacts the sliding surface 262A of the cam follower 262 to position the cam follower 262 relative to the cam member 258 in the actuation direction D2. Thus, the output member 255 is positioned relative to the cam member 258 in the first position P51.

As discussed above, the output member 255 is alternately positioned in the first position P51 and the second position P52 by the positioning structure 270 each time the actuation wire 46 pulls the movable member 242 from the first initial position P221 to the first actuated position P222.

Third Embodiment

A telescopic apparatus 312 in accordance with a third embodiment will be described below referring to FIGS. 28 to 31. The telescopic apparatus 312 has the same structure and/or configuration as those of the telescopic apparatus 12 except for the actuation device 38. Thus, elements having substantially the same function as those in the first embodiment will be numbered the same here and will not be described and/or illustrated again in detail here for the sake of brevity.

Figure 28:
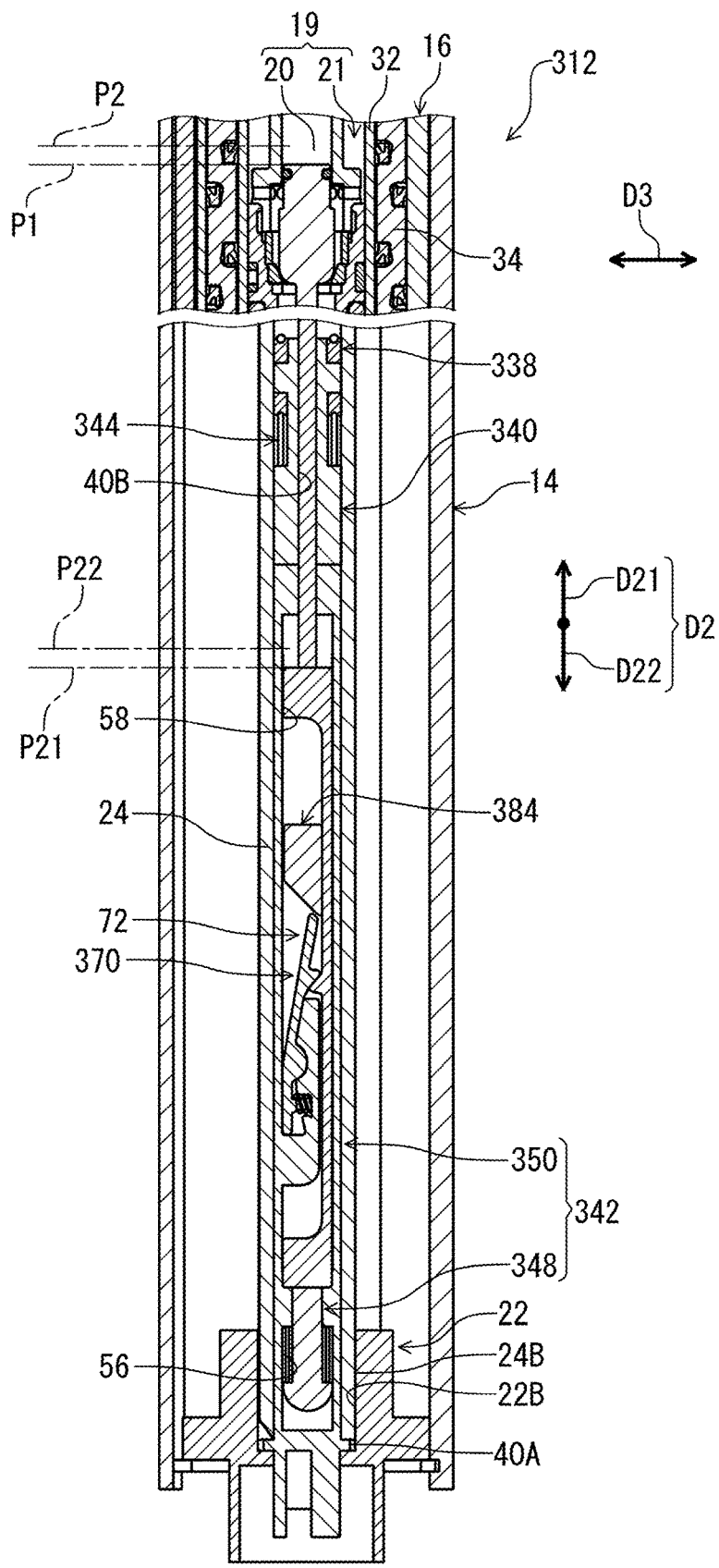
FIG. 28 is a partial cross-sectional view of a telescopic apparatus in accordance with a third embodiment.
Figure 29:
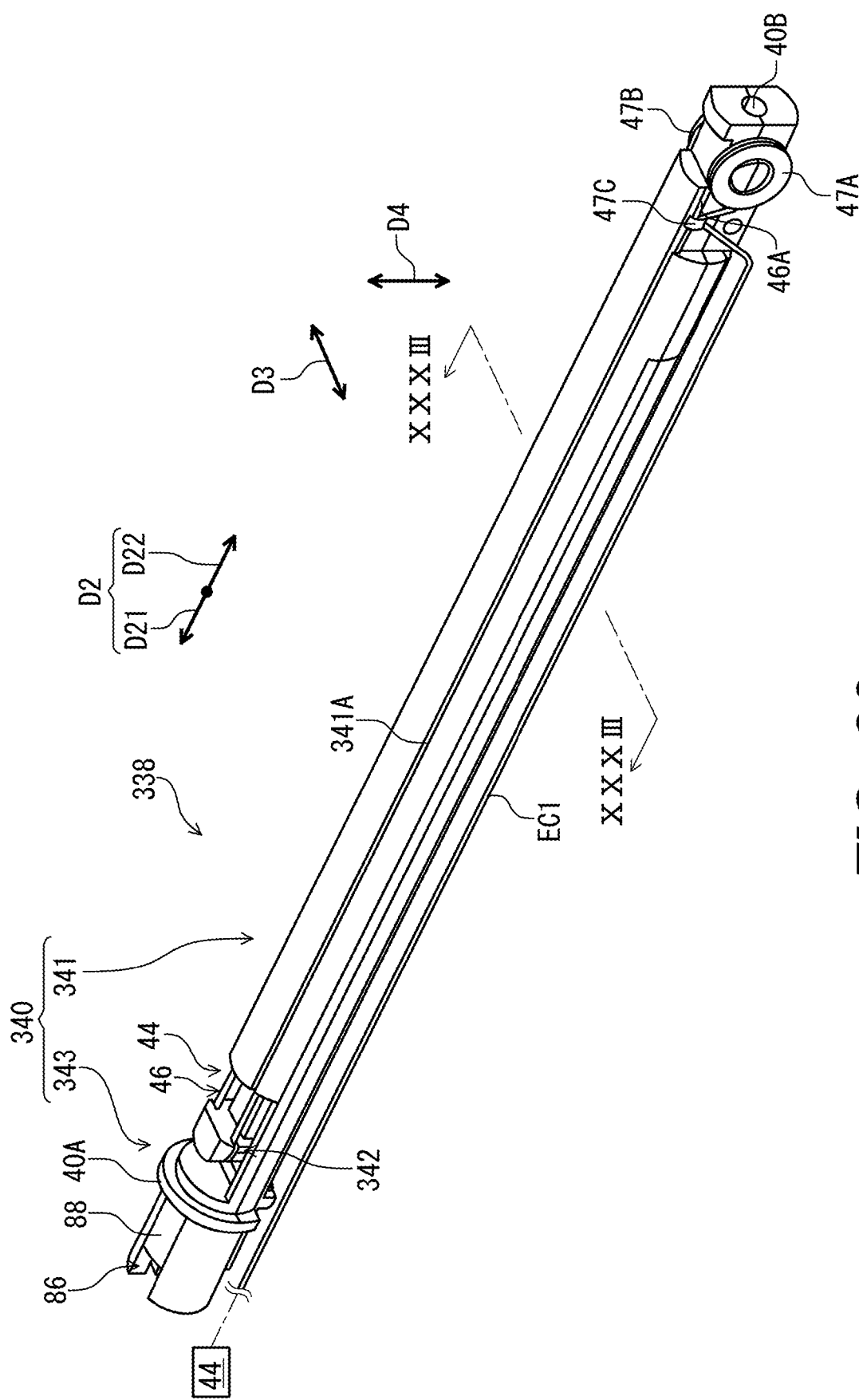
FIG. 29 is a perspective view of an actuation device of the telescopic apparatus illustrated in FIG. 28.

As seen in FIG. 28, the telescopic apparatus 312 comprises an actuation device 338. As seen in FIGS. 28 and 29, the actuation device 338 has substantially the same structure as the structure of the actuation device 38 of the first embodiment. Thus, the description of the actuation device 38 of the first embodiment can be utilized as the description of the actuation device 338 by replacing the actuation device 38 with the actuation device 338.

As seen in FIG. 29, the actuation device 338 for the human-powered vehicle 10 comprises a base member 340, a movable member 342, and the actuator 44. The movable member 342 is movably provided on the base member 340. The actuator 44 is configured to be actuated by stimulation including at least one of electric stimulation and heat stimulation so as to move the movable member 342 relative to the base member 340 in the first direction D21 by pulling the movable member 342. The base member 340 has substantially the same structure as the structure of the base member 40 of the first embodiment. The movable member 342 has substantially the same structure as the structure of the movable member 42 of the first embodiment. Thus, the description of the base member 40 of the first embodiment can be utilized as the description of the base member 340 by replacing the base member 40 with the base member 340. The description of the movable member 42 of the first embodiment can be utilized as the description of the movable member 342 by replacing the movable member 42 with the movable member 342.

Figure 30:
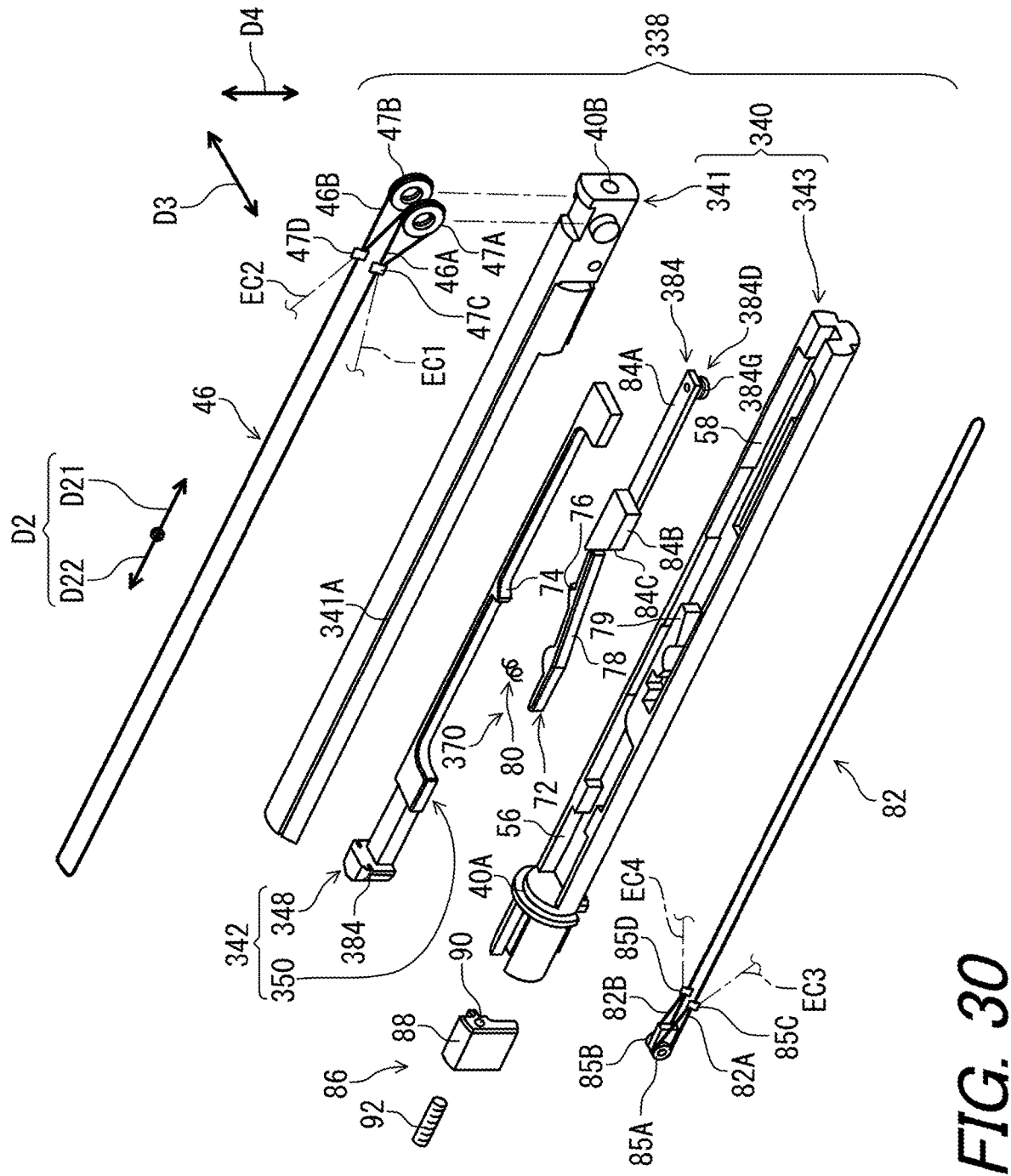
FIG. 30 is an exploded perspective view of the actuation device of the telescopic apparatus illustrated in FIG. 28.
Figure 31:
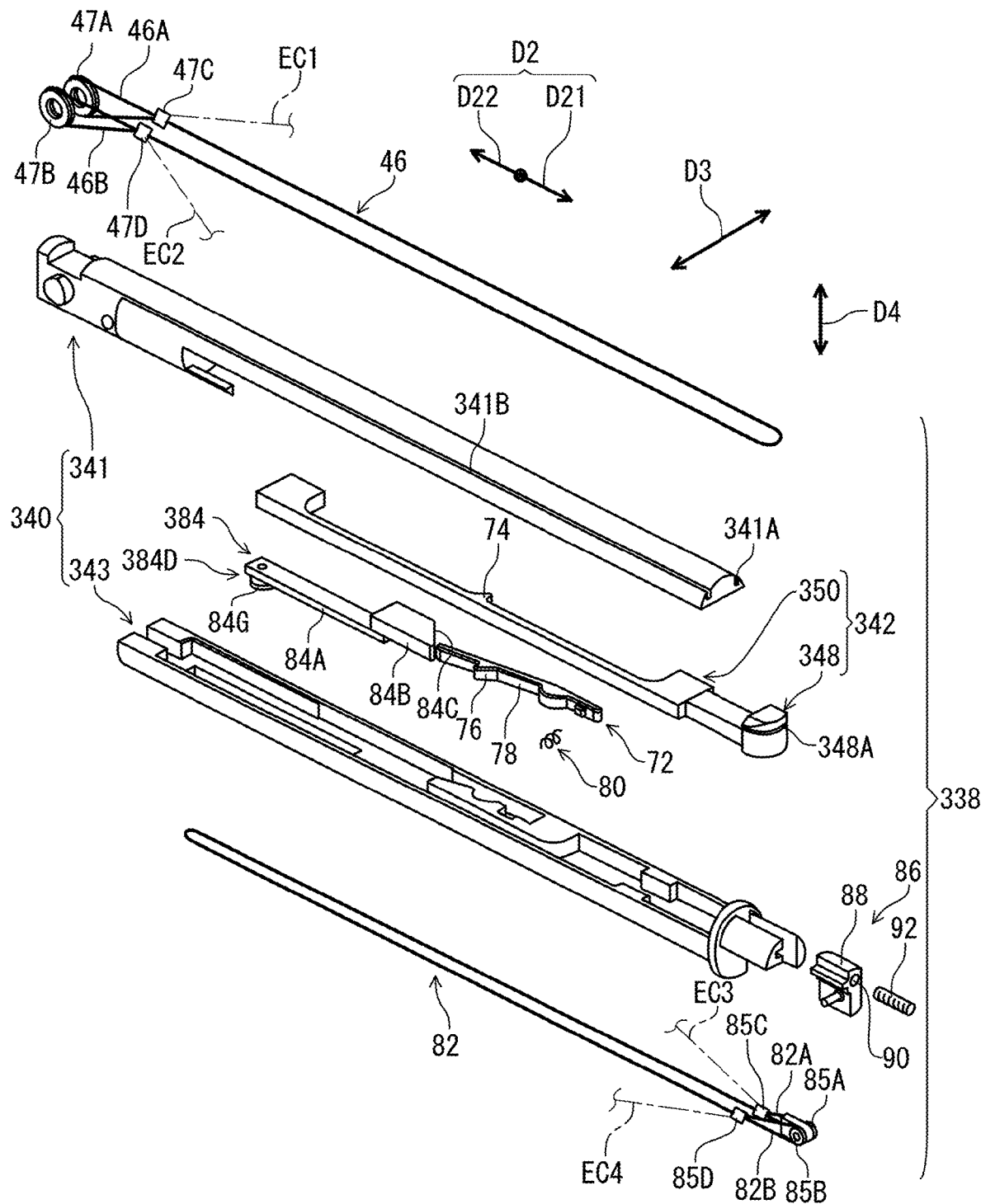
FIG. 31 is another exploded perspective view of the actuation device of the telescopic apparatus illustrated in FIG. 28.

As seen in FIGS. 30 and 31, the base member 340 includes a first base part 341 and a second base part 343. The second base part 343 includes the first guide recess 56 and the second guide recess 58. The movable member 342 includes a first movable part 348 and a second movable part 350. The first movable part 348 is movably provided in the first guide recess 56. The second movable part 350 is movably provided in the second guide recess 58. The movable member 342 is provided between the first base part 341 and the second base part 343. In this embodiment, the first base part 341 is a separate member from the second base part 343. The first base part 341 is attached to the second base part 343. However, the first base part 341 can be integrally provided with the second base part 343 as a one-piece unitary member.

As with the first embodiment, the actuator 44 is configured to deform to pull the movable member 242 in accordance with the stimulation. The first wire coupling member 47A and the second wire coupling member 47B are rotatably attached to the first base part 341 of the base member 340. The first movable part 348 includes a support groove 348A. The base member 340 includes a groove 340G extending along the first direction D21. The actuation wire 46 is provided in the groove 340G. The groove 340G includes a first groove 341A and a second groove 341B. The first groove 341A and the second groove 341B are provided on the first base part 341. The actuation wire 46 is provided in the support groove 348A, the first groove 341A, and the second groove 341B. In this embodiment, the first movable part 348 is a separate member from the second movable part 350. However, the first movable part 348 can be integrally provided with the second movable part 350 as a one-piece unitary member.

The actuation device 338 further comprises a positioning structure 370 configured to maintain a position of the movable member 342. The positioning structure 370 includes the lock member 72. The first movable part 348 includes the first engagement part 74. The first base part 341 includes the lock support 79 provided in the second guide recess 58. The positioning structure 370 has substantially the same structure as the structure of the positioning structure 70 of the first embodiment. Thus, the description of the positioning structure 70 of the first embodiment can be utilized as the description of the positioning structure 370 by replacing the positioning structure 70 with the positioning structure 370.

Figure 32:
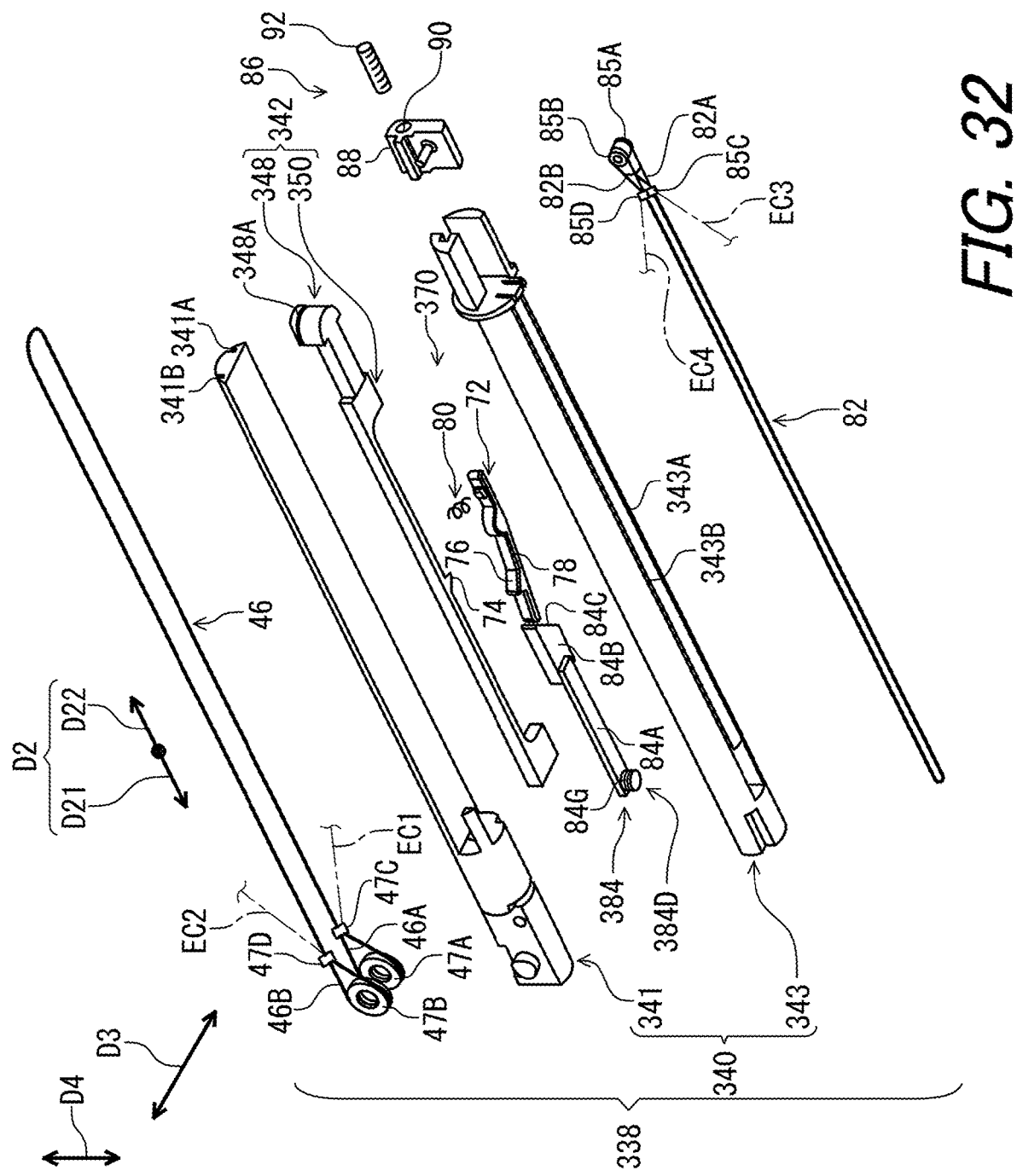
FIG. 32 is another exploded perspective view of the actuation device of the telescopic apparatus illustrated in FIG. 28.

As seen in FIG. 32, the positioning structure 370 includes a release member 384. The release member 384 has substantially the same structure as the structure of the release member 84 of the first embodiment. The release member 384 includes the release body 84A, the release protrusion 84B, and a wire attachment part 384D. The wire attachment part 384D is attached to the release body 84A and includes a support groove 384G. The second base part 343 includes a third groove 343A and a fourth groove 343B. The additional actuation wire 82 is provided in the support groove 384G, the third groove 343A, and the fourth groove 343B. The additional actuation wire 82 is configured to decrease the total length of the additional actuation wire 82 to pull the release member 384 in accordance with the increase in the stimulation.

Figure 33:
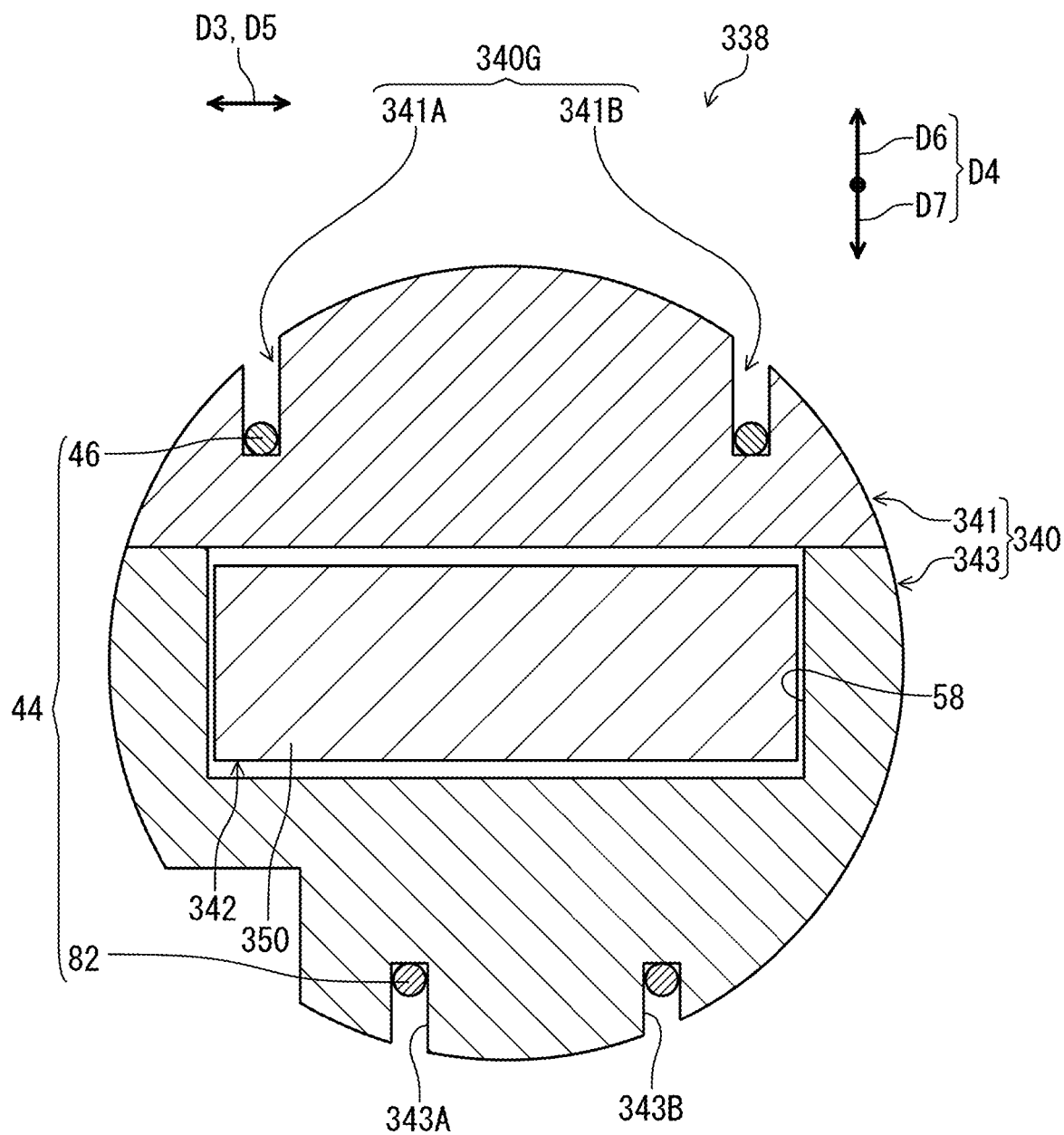
FIG. 33 is a cross-sectional view of the actuation device taken along line XXXIII-XXXIII of FIG. 29.

As seen in FIG. 33, the first groove 341A faces in a third direction D6 perpendicular to the first direction D21. The second groove 341B faces in the third direction D6. The first groove 341A and the second groove 341B are open toward the third direction D6. The third groove 343A faces in a fourth direction D7 opposite to the third direction D6. The fourth groove 343B faces in the fourth direction D7. The third groove 343A and the fourth groove 343B are open toward the fourth direction D7. The third direction D6 and the fourth direction D7 are parallel to the second perpendicular direction D4.

In this embodiment, the base member 340 includes a thermal conductor having electric insulation. The first base part 341 and the second base part 343 include the thermal conductor. The thermal conductor is configured to release energy generated by heat stimulation and/or electric stimulation. In this embodiment, the thermal conductor is configured to release heat generated by heat stimulation and/or electric stimulation. The thermal conductor can be a heat conductor having electric insulation. Examples of the material of the thermal conductor include ##. The base member 340 can include materials other than the material of the thermal conductor.

The base member 340 has a first coefficient of heat transfer. The first base part 341 and the second base part 343 have the first coefficient of heat transfer. The movable member 342 has a second coefficient of heat transfer. The first coefficient of heat transfer is higher than the second coefficient of heat transfer. Thus, thermal energy generated by the actuation wire 46 can be efficiently released from the actuation wire 46 through the base member 340. This can improve response speed of the actuation wire 46 when the actuation wire 46 increases in length in response to the decrease in the electric stimulation. The relationship between the first coefficient of heat transfer and the second coefficient of heat transfer is not limited to this embodiment.

Modifications

In the first to second embodiments, the actuation controller 94 is configured to change the stimulation during receipt of the control signal CS. However, the configuration of the actuation controller 94 is not limited to this embodiment. For example, the actuation controller 94 can be configured to change the stimulation for a predetermined actuation time after receipt of the control signal CS regardless of the signal length of the control signal CS.

In the above embodiments, the actuation controller 94 is a single unit. However, the actuation controller 94 can be a plurality of separates units. Furthermore, in the above embodiments, the actuation controller 94 includes the boost converter 94B. However, the actuation controller 94 can have other circuitry configured to change the stimulation instead of or in addition to the boost converter 94B.

In the above embodiment, the telescopic apparatus 12 includes a height adjustable seatpost assembly. However, the structures of the telescopic apparatus 12 can apply to another apparatus such as a suspension. Furthermore, the structures of the telescopic apparatus 12 can apply to another apparatus other than an apparatus for a bicycle.

In the above embodiment, the actuation controller 94, the operating device 2, and the electric power source 4 are connected to each other using the PLC technology. However, wireless technology can be used to transmit the control signal CS between the operating device 2 and the actuation controller 94. In such an embodiment, the electric power source 4 is electrically connected to the actuation controller 94, and the operating device 2 includes another electric power source.

In the third embodiment, the base member 340 includes the thermal conductor having electric insulation. The thermal conductor can apply to the base members 40 and 240 of the first and second embodiments.

In the third embodiment, the base member 340 has the first coefficient of heat transfer. The movable member 342 has the second coefficient of heat transfer. Each of the base members 40 and 240 can have the first coefficient of heat transfer, and each of the movable members 42 and 242 can have the second coefficient of heat transfer.

Figure 34:
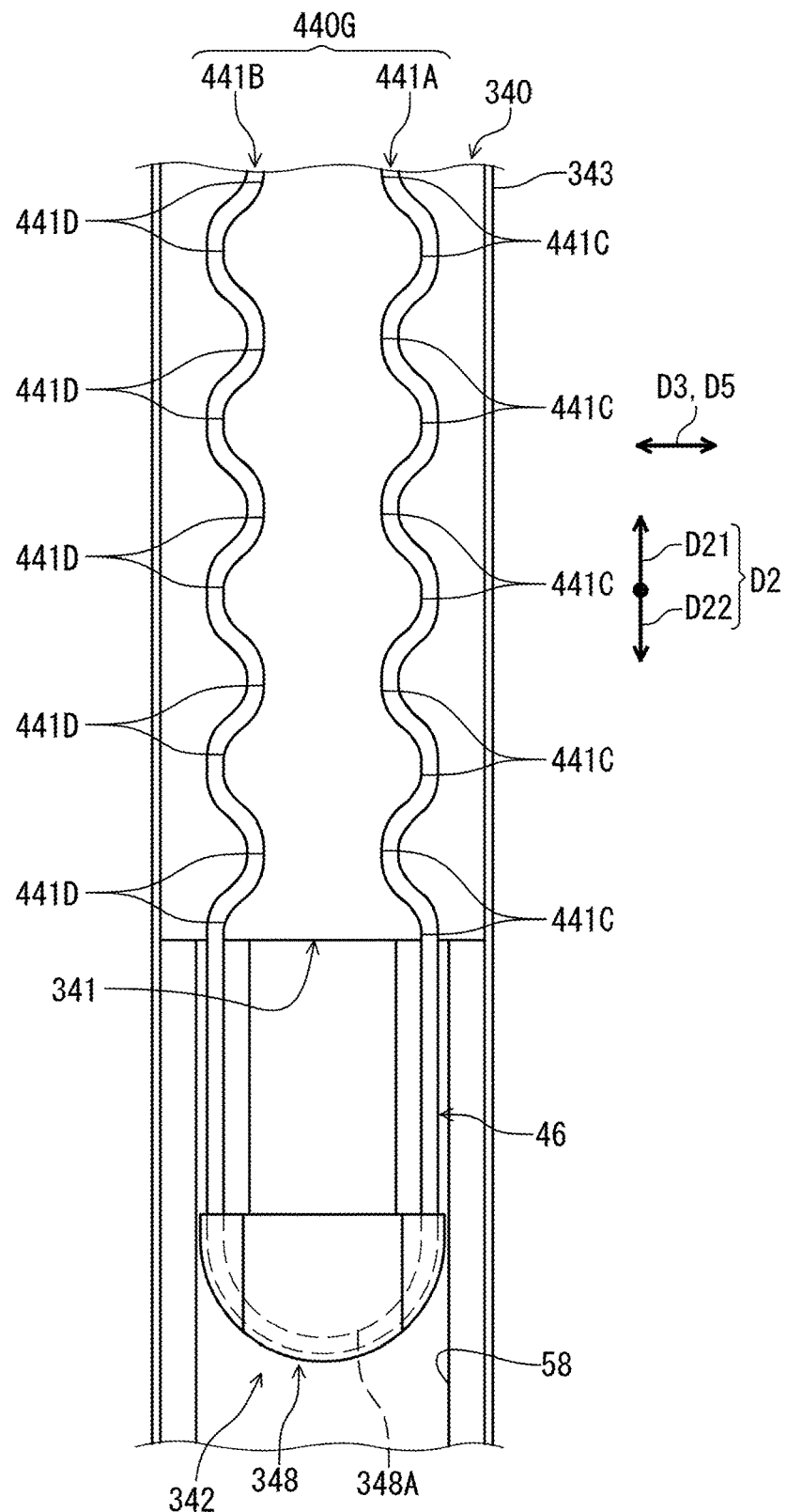
FIG. 34 is an elevational view of an actuation device in accordance with a modification.

In the third embodiments, the groove 340G of the base member 340 has a linear shape extending in the actuation direction D2. As seen in FIG. 34, however, the groove 340G can have a non-linear shape. In this modification of the third embodiment, the base member 340 includes a groove 440G extending along the first direction D21. The actuation wire 46 is provided in the groove 440G. The groove 440G has substantially the same structure as the structure of the groove 340G of the third embodiment. The groove 440G includes an inclined groove inclined relative to the first direction D21. The groove 440G includes a first groove 441A and a second groove 441B which is separate from the first groove 441B. The first groove 441A has substantially the same structure as the structure of the first groove 341A of the third embodiment. The second groove 441B has substantially the same structure as the structure of the second groove 341B of the third embodiment. In this modification, at least one of the first groove 441A and the second groove 441B includes the inclined groove. For example, the groove 440G includes a plurality of inclined grooves. The inclined groove includes a curved groove at least partly inclined relative to the first direction D21. The first groove 441A includes a plurality of first curved grooves 441C connected with each other. The second groove 441B includes a plurality of second curved grooves 441D connected with each other. The actuation wire 46 is provided in the plurality of first curved grooves 441C and the plurality of second curved grooves 441D.

Figure 35:
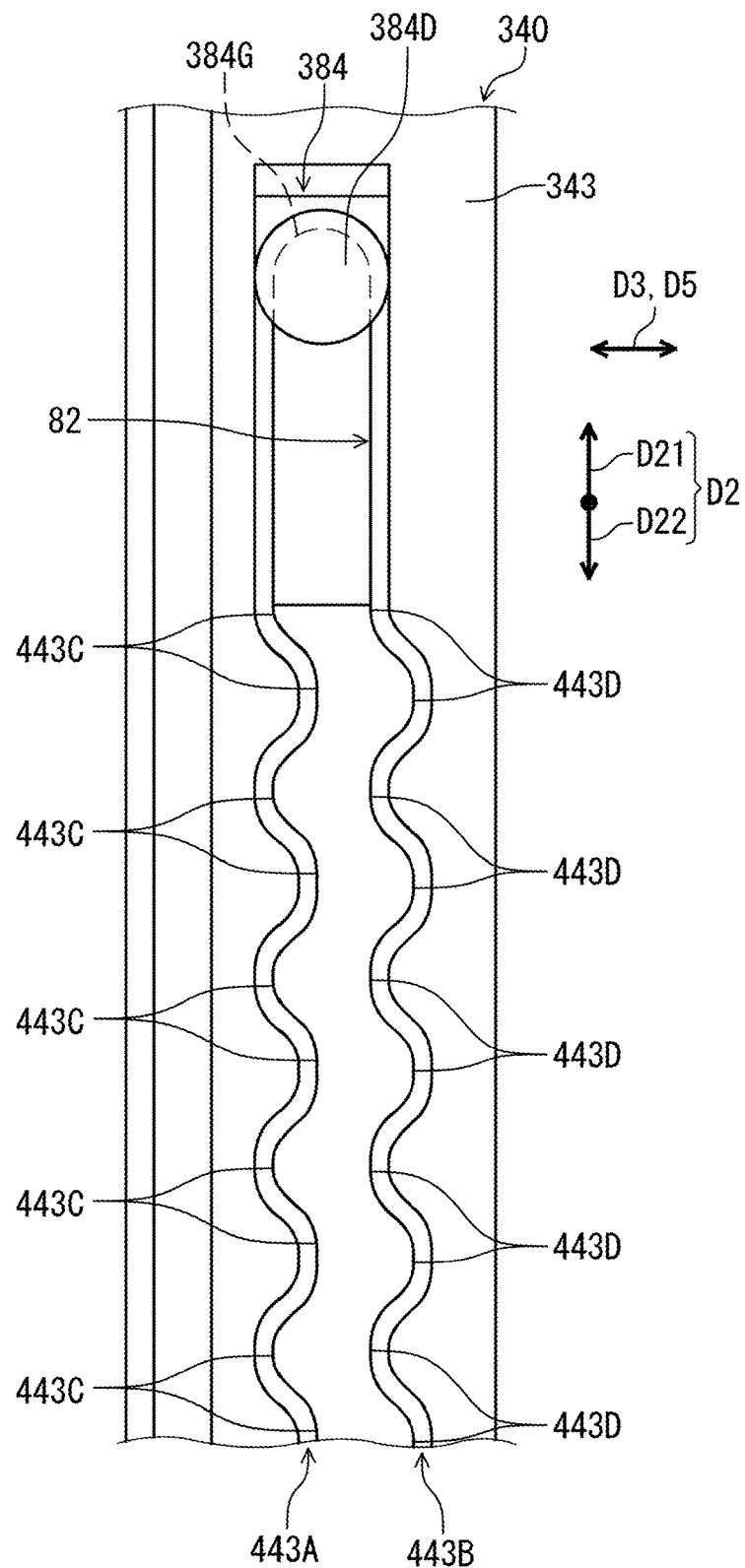
FIG. 35 is another elevational view of an actuation device in accordance with the modification.

As seen in FIG. 35, the second base part 343 can include a third groove 443A and a fourth groove 443B. The additional actuation wire 82 is provided in the third groove 443A and the fourth groove 443B. The third groove 443A has substantially the same structure as the structure of the third groove 343A of the third embodiment. The fourth groove 443B has substantially the same structure as the structure of the fourth groove 343B of the third embodiment. In this modification, the third groove 443A includes an inclined groove inclined relative to the first direction D21. The fourth groove 443B includes an inclined groove inclined relative to the first direction D21. For example, the inclined groove of the third groove 443A includes a curved groove at least partly inclined relative to the first direction D21. The third groove 443A includes a plurality of third curved grooves 443C connected with each other. The fourth groove 443B includes a plurality of fourth curved grooves 443D connected with each other. The additional actuation wire 82 is provided in the plurality of third curved grooves 443C and the plurality of fourth curved grooves 443D.

Figure 36:
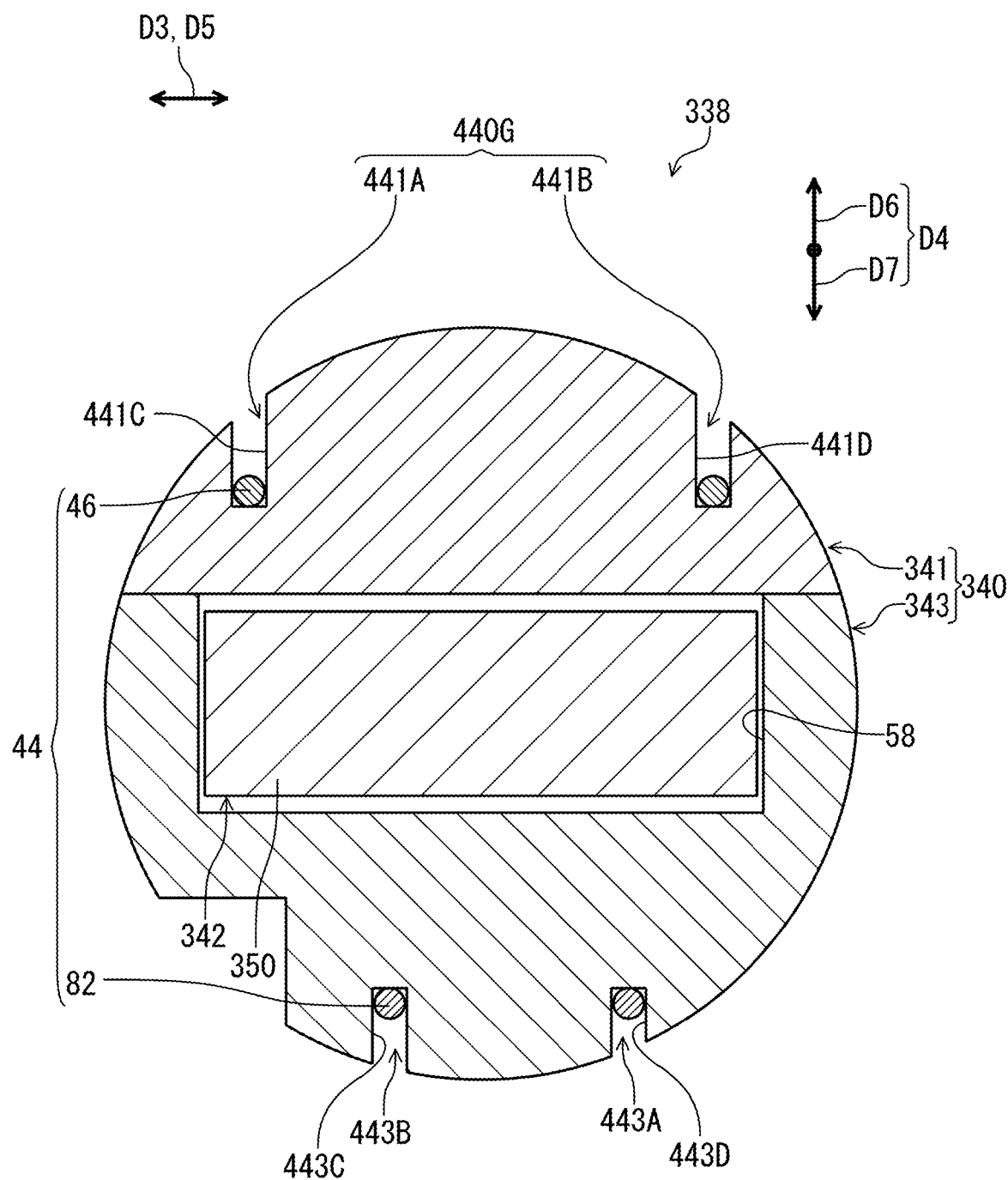
FIG. 36 is a cross-sectional view of the actuation device illustrated in FIG. 34.

As seen in FIG. 36, the first groove 441A faces in the third direction D6 perpendicular to the first direction D21. The second groove 441B faces in the third direction D6. The first groove 441A and the second groove 441B are open toward the third direction D6. The third groove 443A faces in the fourth direction D7. The fourth groove 443B faces in the fourth direction D7. The third groove 443A and the fourth groove 443B are open toward the fourth direction D7. The first curved groove 441C and the second curved groove 441D face in the third direction D6. The third curved groove 443C and the fourth curved groove 443D face in the fourth direction D7.

Figure 37:
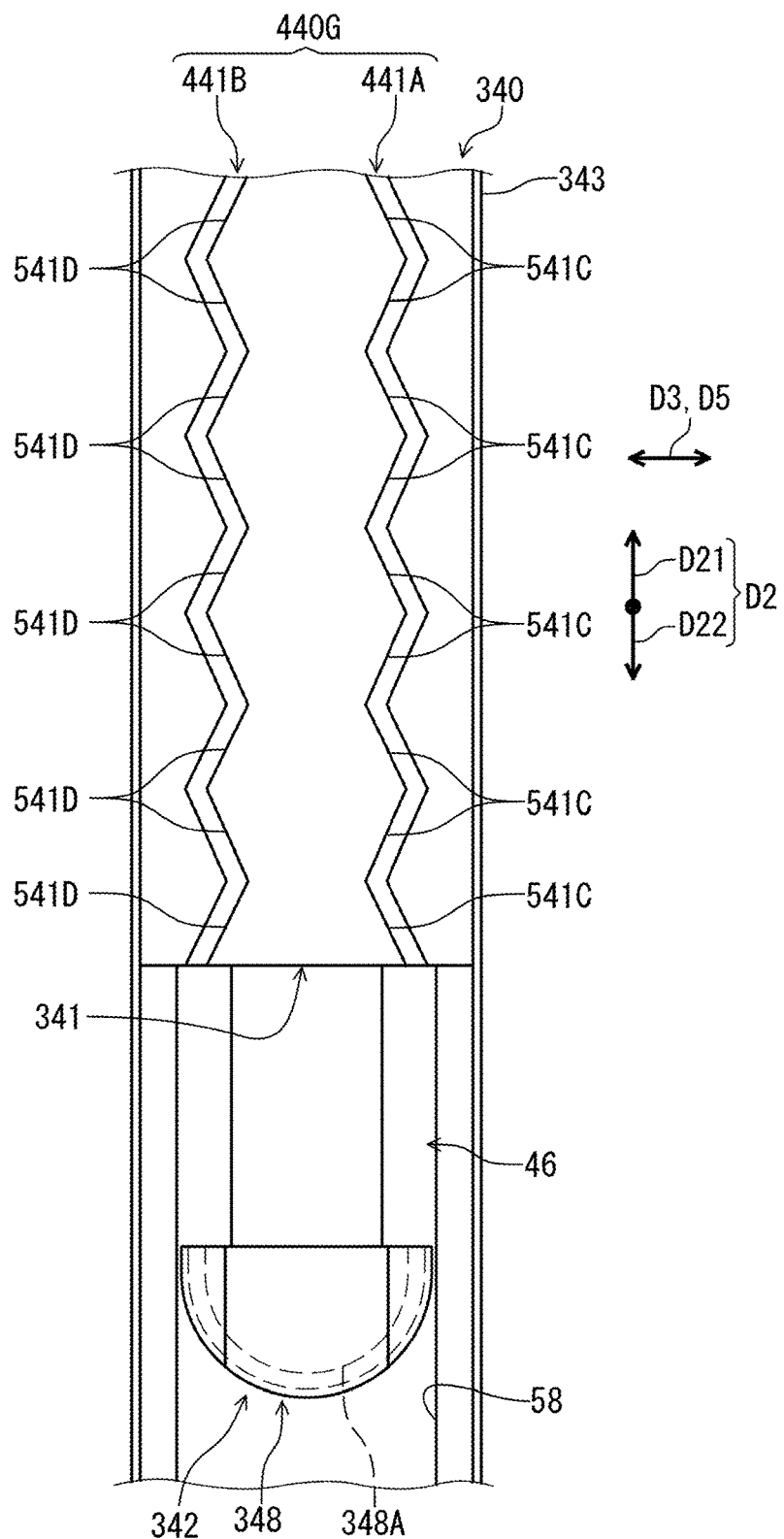
FIG. 37 is an elevational view of an actuation device in accordance with an additional modification.

As seen in FIG. 37, the first groove 441A can include a plurality of first inclined grooves 541C connected with each other instead of the plurality of first curved grooves 441C. The second groove 441B can include a plurality of second inclined grooves 541D connected with each other instead of the plurality of second curved grooves 441D. The first inclined groove 541C has a straight shape. The second inclined groove 541D has a straight shape. The actuation wire 46 is provided in the plurality of first inclined grooves 541C and the plurality of second inclined grooves 541D.

Figure 38:
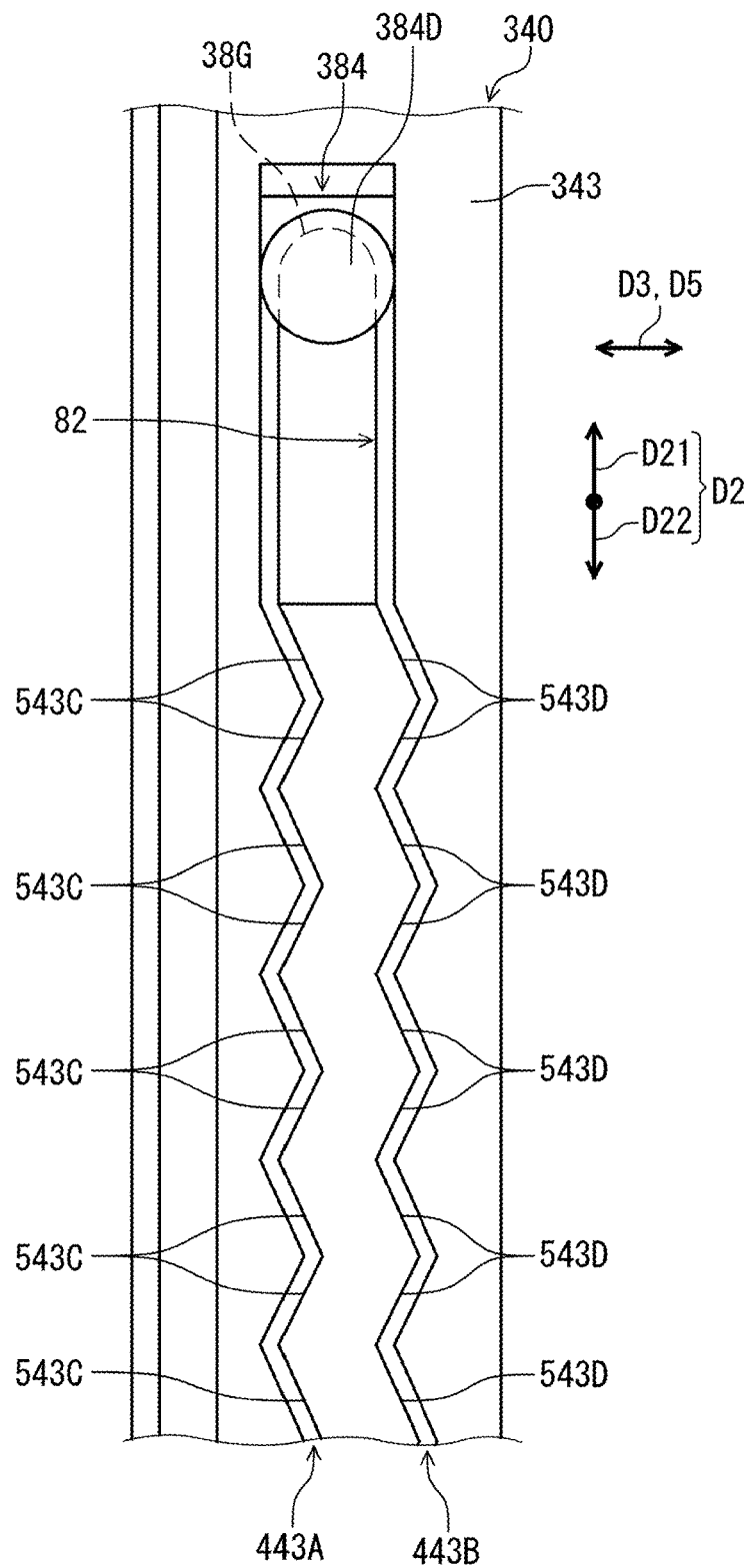
FIG. 38 is another elevational view of an actuation device in accordance with the additional modification.

As seen in FIG. 38, the third groove 443A can include a plurality of third inclined grooves 543C connected with each other instead of the plurality of third curved grooves 443C. The fourth groove 443B can include a plurality of fourth inclined grooves 543D connected with each other instead of the plurality of fourth curved grooves 443D. The third inclined groove 543C has a straight shape. The fourth inclined groove 543D has a straight shape. The additional actuation wire 82 is provided in the plurality of third inclined grooves 543C and the plurality of fourth inclined grooves 543D.

The structures of the grooves 441A, 441B, 443A, and 443B illustrated in FIGS. 34 to 38 can apply to the actuation device 38 of the first and second embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A telescopic apparatus for a human-powered vehicle, comprising:
  an actuation device including
    a base member,
    a movable member movably provided on the base member, and
    an actuator configured to be actuated by stimulation including at least one of electric stimulation and heat stimulation so as to move the movable member relative to the base member in a first direction by pulling the movable member, wherein the actuator is configured to deform to pull the movable member in accordance with the stimulation; and
  a hydraulic structure including a valve configured to control a fluid communication state between a first hydraulic chamber and a second hydraulic chamber, wherein
  the movable member is movable relative to the hydraulic structure to operate the valve.

2. The telescopic apparatus according to claim 1, wherein the actuator is configured to be actuated by the stimulation so as to move the movable member relative to the base member in a second direction different from the first direction.

3. The telescopic apparatus according to claim 2, wherein the second direction is opposite to the first direction.

4. The telescopic apparatus according to claim 1, wherein the actuator includes a shape-memory alloy configured to deform to pull the movable member in accordance with the stimulation.

5. The telescopic apparatus according to claim 1, wherein the actuator includes a nylon fiber configured to deform to pull the movable member in accordance with the stimulation.

6. The telescopic apparatus according to claim 1, wherein the actuator includes an actuation wire configured to vary a total length of the actuation wire to pull the movable member in accordance with a change in the stimulation.

7. The telescopic apparatus according to claim 6, wherein
the actuation wire is configured to decrease the total length of the actuation wire to pull the movable member in accordance with an increase in the stimulation, and
the actuation wire is configured to increase the total length of the actuation wire to release a pulling force of the actuation wire in accordance with a decrease in the stimulation.

8. The telescopic apparatus according to claim 6, further comprising
an adjustment structure configured to adjust a tension of the actuation wire.

9. The telescopic apparatus according to claim 6, further comprising
a positioning structure configured to maintain a position of the movable member.

10. The telescopic apparatus according to claim 9, wherein
the actuation wire is configured to pull the movable member from a first initial position to a first actuated position, and
the positioning structure is configured to position the movable member relative to the base member in the first actuated position after the actuation wire pulls the movable member from the first initial position to the first actuated position.

11. The telescopic apparatus according to claim 10, wherein
the positioning structure includes a lock member engageable with the movable member to position the movable member in the first actuated position.

12. The telescopic apparatus according to claim 11, wherein
the movable member includes a first engagement part, and
the lock member includes a second engagement part engageable with the first engagement part to position the movable member in the first actuated position.

13. The telescopic apparatus according to claim 12, wherein
the actuator includes an additional actuation wire configured to vary a total length of the additional actuation wire to move the movable member in a second direction opposite to the first direction.

14. The telescopic apparatus according to claim 13, further comprising
an additional adjustment structure configured to adjust a tension of the additional actuation wire.

15. The telescopic apparatus according to claim 14, wherein
the additional adjustment structure includes
an adjustment portion provided on the base member, the adjustment portion being coupled to the additional actuation wire,
a threaded hole provided on the adjustment portion, and
an adjustment member threaded into the threaded hole so as to change relative position between the adjustment portion and the base member.

16. The telescopic apparatus according to claim 13, wherein
the additional actuation wire configured to disengage the second engagement part from the first engagement part.

17. The telescopic apparatus according to claim 16, wherein
the lock member is movably coupled to the base member between
a lock position where the second engagement part is engaged with the first engagement part, and
a release position where the second engagement part is disengaged from the first engagement part, and
the additional actuation wire is configured to move the lock member from the lock position to the release position relative to the base member.

18. The telescopic apparatus according to claim 17, wherein
the positioning structure includes a release member movable relative to the movable member between
a second initial position where the lock member is positioned in the lock position, and
a second actuated position where the release member is engaged with the lock member to position the lock member in the release position.

19. The telescopic apparatus according to claim 18, wherein
the additional actuation wire includes
a first additional wire end portion coupled to the base member,
a second additional wire end portion opposite to the first additional wire end portion, the second additional wire end portion being coupled to the base member, and
an additional intermediate portion provided between the first additional wire end portion and the second additional wire end portion, the additional intermediate portion being coupled to the release member.

20. The telescopic apparatus according to claim 18, wherein
the additional actuation wire is configured to pull the release member from the second initial position to the second actuated position in the second direction.

21. The telescopic apparatus according to claim 20, wherein
the additional actuation wire is configured to decrease the total length of the additional actuation wire to pull the release member in accordance with an increase in the stimulation, and
the additional actuation wire is configured to increase the total length of the additional actuation wire to release a pulling force of the additional actuation wire in accordance with a decrease in the stimulation.

22. The telescopic apparatus according to claim 6, wherein
the base member includes a groove extending along the first direction,
the actuation wire is provided in the groove, and the groove includes an inclined groove inclined relative to the first direction.

23. The telescopic apparatus according to claim 22, wherein
the groove includes a first groove and a second groove which is separate from the first groove, and
at least one of the first groove and the second groove includes the inclined groove.

24. The telescopic apparatus according to claim 23, wherein
the first groove faces in a third direction perpendicular to the first direction, and
the second groove faces in the third direction.

25. The telescopic apparatus according to claim 1, wherein
the base member includes a thermal conductor having electric insulation.

26. The telescopic apparatus according to claim 1, wherein
the base member has a first coefficient of heat transfer,
the movable member has a second coefficient of heat transfer, and
the first coefficient of heat transfer is higher than the second coefficient of heat transfer.

27. The telescopic apparatus according to claim 1, further comprising:
a first tube configured to be coupled to the base member; and
a second tube telescopically and movably coupled to the first tube.

28. The telescopic apparatus according to claim 27, wherein
the telescopic apparatus is a height adjustable seatpost assembly.

29. The telescopic apparatus according to claim 1, wherein
the base member has a guide recess, and
the movable member is slidably provided within the guide recess.

30. An actuation device for a human-powered vehicle, comprising:
a base member;
a movable member movably provided on the base member; and
an actuator configured to be actuated by stimulation including at least one of electric stimulation and heat stimulation so as to move the movable member relative to the base member in a first direction by pulling the movable member, wherein
the actuator is configured to deform to pull the movable member in accordance with the stimulation,
the actuator includes an actuation wire configured to vary a total length of the actuation wire to pull the movable member in accordance with a change in the stimulation, and
the actuation wire includes
a first wire end portion coupled to the base member,
a second wire end portion opposite to the first wire end portion, the second wire end portion being coupled to the base member, and
an intermediate portion provided between the first wire end portion and the second wire end portion, the intermediate portion being coupled to the movable member.

31. An actuation device for a human-powered vehicle, comprising:
a base member;
a movable member movably provided on the base member;
an actuator configured to be actuated by stimulation including at least one of electric stimulation and heat stimulation so as to move the movable member relative to the base member in a first direction by pulling the movable member, the actuator is configured to deform to pull the movable member in accordance with the stimulation, the actuator includes an actuation wire configured to vary a total length of the actuation wire to pull the movable member in accordance with a change in the stimulation; and
an adjustment structure configured to adjust a tension of the actuation wire, wherein
the movable member is movable relative to the base member between a first initial position and a first actuated position, and
the adjustment structure is configured to change the first initial position of the movable member relative to the base member.

32. The actuation device according to claim 31, wherein
the movable member includes a first movable part and a second movable part,
the adjustment structure includes
a threaded hole provided on one of the first movable part and the second movable part, and
an adjustment member threaded into the threaded hole so as to change relative position between the first movable part and the second movable part.

* * * * *